US010904810B2

(12) United States Patent
Li et al.

(10) Patent No.: US 10,904,810 B2
(45) Date of Patent: Jan. 26, 2021

(54) HANDOVER METHOD, CORE NETWORK DEVICE, ACCESS NETWORK DEVICE, AND TERMINAL DEVICE

(71) Applicant: HUAWEI TECHNOLOGIES CO., LTD., Guangdong (CN)

(72) Inventors: Bingzhao Li, Beijing (CN); Wei Quan, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/455,940

(22) Filed: Jun. 28, 2019

(65) Prior Publication Data
US 2019/0320368 A1 Oct. 17, 2019

Related U.S. Application Data

(63) Continuation of application No. PCT/CN2016/113866, filed on Dec. 30, 2016.

(51) Int. Cl.
*H04L 12/28* (2006.01)
*H04W 36/12* (2009.01)
(Continued)

(52) U.S. Cl.
CPC ..... *H04W 36/125* (2018.08); *H04W 36/0022* (2013.01); *H04W 36/0033* (2013.01); *H04W 36/0066* (2013.01); *H04W 36/385* (2013.01)

(58) Field of Classification Search
CPC ..................................................... H04L 12/28
(Continued)

(56) References Cited

U.S. PATENT DOCUMENTS

2014/0169269 A1 6/2014 Salot et al.
2014/0313889 A1 10/2014 Jeong et al.
(Continued)

FOREIGN PATENT DOCUMENTS

CN 101500271 A 8/2009
CN 101557609 A 10/2009
(Continued)

OTHER PUBLICATIONS

CN 101557609 ( See translation), pp. 1-12, Oct. 14, 2009.*
(Continued)

*Primary Examiner* — Dang T Ton
(74) *Attorney, Agent, or Firm* — Fish & Richardson P.C.

(57) ABSTRACT

A handover method, an access network device, and a terminal device are provided. A handover method comprising: receiving by an access network device, a change instruction message, wherein the change instruction message is used to instruct the access network device to instruct a terminal device to perform an update, generating, by the access network device, an update message, wherein the update message is used to instruct the terminal device to perform an update; and sending by the access network device, the update message to the terminal device. Based on a handover procedure initiated by the second core network device, the connection between the terminal device and the second core network device may be switched to the connection between the terminal device and the first core network device without switching of the access network device, so that a network communication requirement is efficiently met.

13 Claims, 9 Drawing Sheets

(51) Int. Cl.
*H04W 36/00* (2009.01)
*H04W 36/38* (2009.01)

(58) Field of Classification Search
USPC .......................................................... 370/329
See application file for complete search history.

(56) References Cited

U.S. PATENT DOCUMENTS

2017/0251416 A1    8/2017   Drevon et al.
2020/0037345 A1*   1/2020   Ryoo ................ H04W 72/1268

FOREIGN PATENT DOCUMENTS

| CN | 103338489 A | 10/2013 |
| EP | 3007488 A1 | 4/2016 |
| KR | 20160021032 A | 2/2016 |
| RU | 2605438 C2 | 12/2016 |
| WO | 2016055492 A1 | 4/2016 |

OTHER PUBLICATIONS

3GPP TS 36.413 V14.0.0 (Sep. 2016), 3rd Generation Partnership Project;Technical Specification Group Radio Access Network;Evolved Universal Terrestrial Radio Access Network(E-UTRAN), S1 Application Protocol (S1AP)(Release 14) Sep. 2016, 333 pages.
PCT International Search Report and Written Opinion in International Application No. PCT/CN2016/113,866, dated Aug. 28, 2017, 17 pages (With English Translation).
Office Action issued in Russian Application No. 2019123831/07 (046446) dated Jun. 3, 2020, 8 pages (with English translation).
Search Report issued in Russian Application No. 2019123831/07 (046446) dated May 28, 2020, 4 pages (with English translation).
Samsung, "Mobility with CN type change," 3GPP TSG-RAN WG3 Meeting #94, R3-162740; Reno, Nevada, USA, Nov. 14-18, 2016, 4 pages.
Office Action issued in Chinese Application No. 201680091931.4 dated May 11, 2020, 23 pages (with English translation).
Office Action issued in Korean Application No. 2019-7022123 dated Jun. 30, 2020, 9 pages (with English translation).
Office Action issued in Japanese Application No. 2019-535910 dated Sep. 8, 2020, 7 pages (with English translation).

* cited by examiner

HANDOVER METHOD, CORE NETWORK DEVICE, ACCESS NETWORK DEVICE, AND TERMINAL DEVICE

CROSS-REFERENCE TO RELATED APPLICATIONS

This application is a continuation of International Application No. PCT/CN2016/113866, filed on Dec. 30, 2016, which is hereby incorporated by reference in its entirety.

TECHNICAL FIELD

Embodiments of the present invention relate to the field of wireless communications technologies, and more specifically, to a handover method, a core network device, an access network device, and a terminal device.

BACKGROUND

In a conventional wireless communications network, there is usually an independent network. Correspondingly, each network has a core network device and an access network device corresponding to the network. FIG. 1 shows two independent networks. 3G network is used as an example. A core network device of 3G network may be a serving GPRS support node (SGSN), and an access network device of 3G network may be a radio network controller (RNC). For a 4G network, an access network device of the 4G network may be an eNB, and a core network device of the 4G network may be a mobility management entity (MME), or a PDN gateway (P-GW)/gateway GPRS support node (GGSN). When a terminal device is handed over from a network to another, for example, when the terminal device is handed over from a 3G network to the 4G network, access network devices and core network devices of the two networks need to be scheduled. Specifically, the following procedure or a similar procedure may be included. An RNC determines, based on measurement of UE, a target cell to which a handover needs to be performed, selects a target eNB based on the target cell, and then sends a handover request to an SGSN. The SGSN forwards the handover message to an MME. The MME establishes a connection to an S-GW/P-GW and the eNB in an LTE network. After establishing the connection to the target eNB, the MME notifies the SGSN of a successfully established radio access bearer (RAB), and the SGSN is responsible for notifying the RNC of an unsuccessfully established RAB that needs to be released and a successfully established RAB for which data forwarding is required.

With development of wireless communications technologies, when a network structure changes, an existing solution cannot resolve a problem of switching of a connection between a terminal device and a core network device.

SUMMARY

Embodiments of the present invention provide a handover method, a core network device, an access network device, and a terminal device, to provide a more effective handover solution when a network structure changes.

According to one aspect, an embodiment of the present invention provides a handover method. The method is applied to a communications system shown in FIG. 3. The communications system includes a terminal device, an access network device, a first core network device, and a second core network device. The first core network device and the second core network device communicate with the terminal device by using the same access network device. The method includes the following steps.

Optionally, 311. The terminal device establishes a connection to the second core network device.

Optionally, 312. The access network device sends a first message to the second core network device, where the first message includes information about a route distinguisher of the first core network device or information about an identifier of the access network device in a first core network. The information about the route distinguisher of the first core network device is used to indicate a route of a message that is to be sent by the second core network device to the first core network device.

Optionally, 313. The second core network device receives a capability message, where the capability message is used to indicate that the terminal device supports the terminal device in establishing a connection to the first core network device.

321. The second core network device determines that a connection between the terminal device and the second core network device needs to be switched to a connection between the terminal device and the first core network device. Further, the second core network device may determine, based on a condition of the second core network device, that the switching is required. For example, no more services can be accepted based on a load status of the second core network device. For example, a threshold is exceeded for a condition. For example, a quantity of terminal devices currently accessing the second core network exceeds a particular threshold. Alternatively, the switching may be triggered based on an event, for example, an event that a message sent by another network element is received. Alternatively, the switching may be triggered based on service information of the terminal device, for example, the terminal device is more suitable to run in the first core network based on a characteristic of a service currently requested by a user of the terminal device.

323. The second core network device sends a change message to the first core network device, where the change message is used to notify the first core network device that the connection between the terminal device and the second core network device needs to be switched to the connection between the terminal device and the first core network device. Optionally, the change message includes at least one or a combination of the following content: a first key of the terminal device, the information about the identifier of the access network device in the first core network, and information about an identifier of the terminal device on a second core network interface. Because the second core network device has established the connection to the terminal device, the second core network device has stored the first key of the terminal device. The second core network device may obtain, based on the information about the route distinguisher of the first core network device, a route for sending the change message to the first core network device. Further, the second core network device sends the change message after generating the message.

325. The first core network device generates a change instruction message, where the change instruction message is used to instruct the access network device to instruct the terminal device to perform an update. Optionally, the change instruction message includes a second key of the terminal device and/or the information about the identifier of the terminal device on the second core network interface, and the second key is obtained based on the first key. The identifier of the terminal device on the second core network interface includes an identifier used to identify the terminal device on an interface through which the access network device communicates with the second core network device, for example, may be an S1 AP UE ID. Usually, the S1 AP UE ID includes a pair of UE identifiers. For example, the S1 AP UE ID further includes an eNB S1 AP UE ID and/or an MME S1 AP UE ID. The eNB S1 AP UE ID is an identifier used to identify UE on a base station side on an S1 interface, and the MME S1 AP UE ID is an identifier used to identify the UE on an MME side on the S1 interface. Likewise, the identifier may alternatively be an NG1 AP UE ID, and the NG1 AP UE ID identifier includes a gNB NG1 AP UE ID and/or an NG-C NG1 AP UE ID.

After receiving the change message, the first core network device may learn that the first core network device is to accept a task of establishing a connection to the terminal device, and correspondingly, the first core network device prepares a resource to prepare to establish communication with the terminal device. If the first core network device determines that the first core network device cannot accept the task, the first core network device may feed back a reject message to the second core network device (not shown), and the second core network device then searches for another core network device or another processing manner based on the reject message (not shown).

The first key is a key that is used for communication between the terminal device and the second core network device and that is adapted to a second core network technology. The first core network device deduces the adapted second key of the terminal device in the first core network based on the first key of the terminal device by using a core network technology of the first core network device. Correspondingly, the second key is a key that is used for communication between the terminal device and the first core network device and that is adapted to a first core network technology.

327. The first core network device sends the change instruction message to the access network device. Further, the first core network device may send the change instruction message to the access network device based on the information about the identifier of the access network device in the first core network.

328. The access network device generates an update message, where the update message is used to instruct the terminal device to perform an update, and optionally, the update message is used to instruct the terminal device to update a NAS type and/or update a key of the terminal device. The updated key of the terminal device is obtained based on a local key stored on the terminal device. Optionally, a new key is deduced from the local key by using a deduction method that is the same as that of the first core network device. A NAS of the terminal device is a function of communication between the terminal device and a core network device, and different types of NASs need to be used between the terminal device and different types of core network devices. For example, a NAS function defined in a 3G protocol needs to be used for communication between the terminal device and a core network device of 3G, a NAS function defined in a 4G protocol needs to be used for communication between the terminal device and a core network device of 4G, and a NAS function defined in a 5G protocol needs to be used for communication between the terminal device and a core network device of 5G.

329. The access network device notifies the terminal device of the update message.

341. The terminal device updates the local key and/or changes the non-access stratum NAS type based on the update message.

Optionally, 331. The access network device sends an acknowledgement message to the first core network device, where the acknowledgement message is used to indicate that the access network device and the terminal device complete the switching.

Optionally, 332. The first core network device sends a release message to the second core network device, where the release message is used to instruct the second core network device to release the connection between the terminal device and the second core network device.

The method may further include step 331' as an alternative to steps 331 and 332: The access network device sends a release message to the second core network device, where the release message is used to instruct the second core network device to release the connection between the terminal device and the second core network device.

Optionally, the second core network device releases the connection between the terminal device and the second core network device (not shown).

Based on a handover procedure initiated by the second core network device, the connection between the terminal device and the second core network device may be switched to the connection between the terminal device and the first core network device without switching of the access network device, so that a network communication requirement is efficiently met.

Further, in a network communication process, the terminal device updates the key of the terminal device and a used communication protocol in a timely manner, to successfully complete the switching.

The communications system, the second core network device, the first core network device, the access network device, and the terminal device that use the foregoing method are separately disclosed and have similar advantages. Refer to FIG. 3, FIG. 3-1, FIG. 3-2, FIG. 3-3, and FIG. 3-4.

According to another aspect, an embodiment of the present invention provides a handover method. The method is applied to a communications system shown in FIG. 4. The communications system includes a terminal device, an access network device, a first core network device, and a second core network device. The first core network device and the second core network device communicate with the terminal device by using the same access network device.

The method includes the following steps.

Optionally, 311. The terminal device establishes a connection to the second core network device by using the access network device.

Optionally, 312. The access network device sends a first message to the second core network device, where the first message includes information about a route distinguisher of the first core network device or information about an identifier of the access network device in a first core network.

421. The access network device determines that a connection between the terminal device and the second core network device needs to be switched to a connection between the terminal device and the first core network device. Further, the access network device may initiate the switching based on a condition of the access network or a status of the second core network device. For example, the access network device speculates that no more services can be accepted based on a load status of the second core network device. Alternatively, the access network device receives a message of the second core network device and is notified that the switching is required, and in this case, the access network device actively determines that the switching is required. It may be understood that the access network device may alternatively receive a message sent by another network element, to trigger the switching.

422. The access network device sends a change message to the second core network device, where the change message is used to notify the second core network device that the connection between the terminal device and the second core network device needs to be switched to the connection between the terminal device and the first core network device. Optionally, the change message includes information about an identifier of the terminal device on a second core network interface. The identifier of the terminal device on the second core network interface is an identifier used to identify the terminal device on an interface through which the access network device communicates with the second core network device.

Optionally, the change message may include the information about the route distinguisher of the first core network device and/or the information about the identifier of the access network device in the first core network. It may be understood that the two types of information are used by the second core network device. If the second core network device has learned of the information or a part of the information in another manner, it is unnecessary to send the known information by using step 312 or step 422. It may be understood that one or both of the information about the route distinguisher of the first core network device and the information about the identifier of the access network device in the first core network may be sent by using the first message in step 312. In this case, the change message in step 422 may not include information that has been sent by using the first message. Alternatively, one or both of the information about the route distinguisher of the first core network device and the information about the identifier of the access network device in the first core network may be sent by using the change message in step 422. In this case, the first message in step 312 may not include information that needs to be sent by using the change message, or even step 312 is omitted.

423. The second core network device generates a change acknowledgement message, where the change acknowledgement message is used to notify the first core network device that the connection between the terminal device and the second core network device needs to be switched to the connection between the terminal device and the first core network device. Optionally, the change acknowledgement message includes one or a combination of the following three items: a first key of the terminal device, the information about the identifier of the access network device in the first core network, and the information about the identifier of the terminal device on the second core network interface. The second core network device receives the change message, learns that the connection between the terminal device and the second core network device needs to be switched to the connection between the terminal device and the first core network device, and correspondingly prepares a communication resource. To enable the first core network device to successfully connect to the terminal device, the second core network device sends corresponding information. The first key of the terminal device, the information about the identifier of the access network device in the first core network, and the information about the identifier of the terminal device on the second core network interface are similar to or consistent with those in the solution in FIG. 3. Details are not described again.

424. The second core network device sends the change acknowledgement message to the first core network device.

Optionally, the second core network device may find the first core network device based on the information about the route distinguisher of the first core network device.

325. The first core network device generates a change instruction message, where the change instruction message is used to instruct the access network device to instruct the terminal device to perform an update. Optionally, the change instruction message includes a second key of the terminal device and/or the information about the identifier of the terminal device on the second core network interface, and the second key is obtained based on the first key.

327. The first core network device sends the change instruction message to the access network device.

328. The access network device generates an update message, where the update message is used to instruct the terminal device to perform an update, and optionally, the update message is used to instruct the terminal device to update a NAS type and/or update a key of the terminal device. The updated key of the terminal device is obtained based on a local key stored on the terminal device.

329. The access network device notifies the terminal device of the update message.

341. The terminal device updates the local key and/or changes the non-access stratum NAS type based on the update message. The updating a NAS type includes: updating a NAS type used for communication with the second core network device to a NAS type used for communication with the first core network device; and the updating a key of the terminal device includes: updating the first key used for communication with the second core network device to the second key used for communication with the first core network device.

Optionally, 331. The access network device sends an acknowledgement message to the first core network device, where the acknowledgement message is used to indicate that the access network device and the terminal device complete the switching.

Optionally, 332. The first core network device sends a release message to the second core network device, where the release message is used to instruct the second core network device to release the connection between the terminal device and the second core network device.

The method may further include step 331' as an alternative to steps 331 and 332: The access network device sends a release message to the second core network device, where the release message is used to instruct the second core network device to release the connection between the terminal device and the second core network device.

Further, the second core network device releases the connection between the terminal device and the second core network device (not shown).

Based on a handover procedure initiated by the access network device, the connection between the terminal device and the second core network device may be switched to the connection between the terminal device and the first core network device without switching of the access network device, so that a network communication requirement is efficiently met.

The communications system, the second core network device, the first core network device, the access network device, and the terminal device that use the foregoing method are separately disclosed and have similar advantages. Refer to FIG. 4, FIG. 4-1, FIG. 4-2, FIG. 4-3, and FIG. 4-4.

According to still another aspect, an embodiment of the present invention provides a handover method. The method is applied to a communications system shown in FIG. 5. The communications system includes a terminal device, a first access network device, a second access network device, a first core network device, and a second core network device. The first core network device and the second core network device communicate with the terminal device by using a same access network device, and the same access network device is the first access network device.

The method includes the following steps.

Optionally, 311. The terminal device establishes a connection to the second core network device by using the second access network device.

Optionally, 312. The first access network device sends a first message to the second core network device, where the first message includes information about a route distinguisher of the first core network device or information about an identifier of the access network device in a first core network.

Optionally, 313. The second core network device receives a capability message, where the capability message is used to indicate that the terminal device supports the terminal device in establishing a connection to the first core network device.

514. The second access network device generates a handover message, where the handover message is used to indicate that a connection between the terminal device and the second access network device needs to be switched to a connection between the terminal device and the first access network device. Further, the handover message includes information about an identifier of the terminal device on a second core network interface. The identifier of the terminal device on the second core network interface includes an identifier used to identify the terminal device on an interface through which the access network device communicates with the second core network device, for example, may be an S1 AP UE ID.

515. The second access network device sends the handover message to the first access network device.

The second access network device sends the handover message to instruct another network element to prepare to establish a connection to the terminal device.

516. The first access network device generates a report message, where the report message is used to notify the second core network device that the connection between the terminal device and the second access network device needs to be switched to the connection between the terminal device and the first access network device. Further, the report message includes the information about the identifier of the terminal device on the second core network interface. Similar to the change message in the another aspect, the report message may further include the information about the route distinguisher of the first core network device or the information about the identifier of the access network device in the first core network.

517. The first access network device sends the report message to the second core network device.

521. The second core network device determines that a connection between the terminal device and the second core network device needs to be switched to a connection between the terminal device and the first core network device.

523. The second core network device sends a change message to the first core network device, where the change message is used to notify the first core network device that the connection between the terminal device and the second core network device needs to be switched to the connection between the terminal device and the first core network device. Optionally, the change message includes at least one or a combination of the following content: a first key of the terminal device, the information about the identifier of the access network device in the first core network, and the information about the identifier of the terminal device on the second core network interface.

325. The first core network device generates a change instruction message, where the change instruction message is used to instruct the access network device to instruct the terminal device to perform an update. Optionally, the change instruction message includes a second key of the terminal device and/or the information about the identifier of the terminal device on the second core network interface, and the second key is obtained based on the first key.

327. The first core network device sends the change instruction message to the first access network device. Further, the first core network device may send the change instruction message to the access network device based on the information about the identifier of the access network device in the first core network.

328. The first access network device generates an update message, where the update message is used to instruct the terminal device to perform an update, and optionally, the update message is used to instruct the terminal device to update a NAS type and/or update a key of the terminal device. The updated key of the terminal device is obtained based on a local key stored on the terminal device.

529. The first access network device notifies the terminal device of the update message.

It may be understood that, if the first access network device has completed an inter-cell handover from the second access network device, in other words, the first access network device has established a direct connection to the terminal device, the second access network device no longer needs to be used, and the first access network device may directly notify the terminal device of the update message. It may be understood that, as an alternative solution, the first access network device may use the second access network device to forward the update message (not shown), in other words, the second access network device does not process the update message and only forwards the update message.

Optionally, the method may further include: sending, by the first access network device, a message to the second access network device (not shown), where the message is used to indicate to the second access network device that the switching has been completed and the connection to the terminal device may be released. The message may be sent before the update message, or may be sent after the update message, and a similar function may be alternatively completed by using information carried in the update message.

341. The terminal device updates the local key and/or changes the non-access stratum NAS type based on the update message. Refer to the solution in FIG. 3.

Optionally, 331. The access network device sends an acknowledgement message to the first core network device, where the acknowledgement message is used to indicate that the access network device and the terminal device complete the switching.

Optionally, 332. The first core network device sends a release message to the second core network device, where the release message is used to instruct the second core network device to release the connection between the terminal device and the second core network device.

The method may further include step 331' as an alternative to steps 331 and 332: The access network device sends a release message to the second core network device, where the release message is used to instruct the second core network device to release the connection between the terminal device and the second core network device.

Optionally, the second core network device releases the connection between the terminal device and the second core network device (not shown).

Based on a handover procedure initiated by the second core network device, the connection between the terminal device and the second core network device may be switched to the connection between the terminal device and the first core network device without switching of the access network device, so that a network communication requirement is efficiently met.

For the terminal device, only a conventional inter-cell handover is initially initiated. To be specific, a handover from the second access network device to the first access network device is performed. However, because the first access network device accesses the first core network device in addition to accessing the second core network device, the second core network device further triggers a handover from the second core network device to the first core network device based on the conventional inter-cell handover, so that different service quality is provided. For example, UE originally performs only an inter-cell handover in a 5G network. Because a target base station is an e-eNB, and the base station may also access a 4G network, a core network device of 5G further hands over the UE to the 4G network, and a corresponding core network device also becomes an EPC of 4G. It can be learned that, in an early stage of establishing the 5G network, because a service capability of 5G is insufficient, the UE can be handed over to the 4G network more quickly by using the foregoing solution, so that a handover requirement is met.

The communications system, the second core network device, the first core network device, the first access network device, the terminal device, and the second access network device that use the foregoing method are separately disclosed and have similar advantages. Refer to FIG. 5, FIG. 5-1, FIG. 5-2, FIG. 5-3, FIG. 5-4, and FIG. 5-5.

According to still another aspect, an embodiment of the present invention provides a computer-readable storage medium, where the computer-readable storage medium stores an instruction used to implement the method used by the foregoing communications device, and the instruction includes a program designed to perform the foregoing aspects. The communications device may be a core network device, an access network device, or a terminal device.

According to still another aspect, an embodiment of the present invention provides a communications device, where the communications device includes a memory and a processor, the memory includes the computer-readable storage medium in the foregoing aspect, and the processor is configured to execute the instruction that is used to implement the method used by the communications device and that is stored in the computer-readable storage medium. The communications device may be a core network device, an access network device, or a terminal device.

According to still another aspect, an embodiment of the present invention provides a communications system, where the system includes the core network device, the access network device, and the terminal device in the foregoing aspects.

According to the technical solutions provided in the embodiments of the present invention, a new handover solution may be provided. In the system, the first core network device and the second core network device communicate with the terminal device by using the same access network device.

DESCRIPTION OF DRAWINGS

FIG. 3-1 is a schematic diagram of a second core network device according to an embodiment of the present invention;

FIG. 3-2 is a schematic diagram of a first core network device according to an embodiment of the present invention;

FIG. 3-3 is a schematic diagram of an access network device according to an embodiment of the present invention;

FIG. 3-4 is a schematic diagram of a terminal device according to an embodiment of the present invention;

FIG. 4 is a schematic flowchart of a handover method according to an embodiment of the present invention;

FIG. 4-1 is a schematic diagram of a second core network device according to an embodiment of the present invention;

FIG. 4-2 is a schematic diagram of a first core network device according to an embodiment of the present invention;

FIG. 4-3 is a schematic diagram of an access network device according to an embodiment of the present invention;

FIG. 4-4 is a schematic diagram of a terminal device according to an embodiment of the present invention;

FIG. 5-1 is a schematic diagram of a second core network device according to an embodiment of the present invention;

FIG. 5-2 is a schematic diagram of a first core network device according to an embodiment of the present invention;

FIG. 5-3 is a schematic diagram of a first access network device according to an embodiment of the present invention;

FIG. 5-4 is a schematic diagram of a terminal device according to an embodiment of the present invention;

FIG. 5-5 is a schematic diagram of a second access network device according to an embodiment of the present invention;

DESCRIPTION OF EMBODIMENTS

Figure 2:
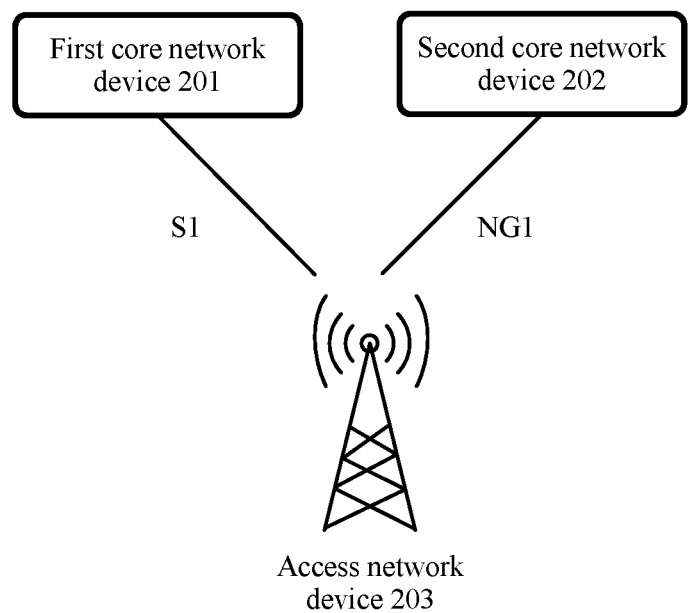
FIG. 2 is a schematic diagram of a communications system according to an embodiment of the present invention.

An embodiment of the present invention provides a solution based on a communications system shown in FIG. 2. As shown in FIG. 2, an embodiment of the present invention provides a communications system. The communications system includes an access network device 203 (such as an e-eNB), a first core network device 201 (such as an EPC), and a second core network device 202 (such as a NextGen Core). A corresponding interface may be an S1 interface or an NG1 interface.

The technical solutions in embodiments of the present invention may be applied to various communications systems for data processing, for example, a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA) system, and another system. The terms "system" and "network" can be interchanged with each other. Radio technologies such as universal terrestrial radio access (UTRA) and CDMA2000 may be implemented in the CDMA system. The UTRA may include a Wideband CDMA (WCDMA) technology and another technology transformed from CDMA. The CDMA2000 may cover Interim Standard (IS) 2000 (IS-2000), the IS-95 standard, and the IS-856 standard. A radio technology such as a Global System for Mobile Communications (GSM) may be implemented in the TDMA system. Radio technologies such as evolved universal terrestrial radio access (E-UTRA), ultra mobile broadband (UMB), IEEE 802.11 (Wi-Fi), IEEE 802.16 (WiMAX), IEEE 802.20, and Flash OFDMA may be implemented in the OFDMA system. The UTRA corresponds to UMTS, and the E-UTRA corresponds to an evolved version of the UMTS. A new version of the UMTS, namely, the E-UTRA, is used in 3GPP long term evolution (LTE) and various versions evolved based on LTE. A 5th Generation (5G) communications system and New Radio (NR) are next generation communications systems under study. In addition, the communications system 200 is further applicable to a future-oriented communications technology to which the technical solutions provided in the embodiments of the present invention are applicable. System architectures and service scenarios described in the embodiments of the present invention are intended to more clearly describe the technical solutions in the embodiments of the present invention, but are not intended to limit the technical solutions provided in the embodiments of the present invention. A person of ordinary skill in the art may know that as network architectures evolve and a new service scenario emerges, the technical solutions provided in the embodiments of the present invention are further applicable to a similar technical problem.

A terminal device, also referred to as user equipment (UE), a mobile terminal (MT), mobile user equipment, or the like, may communicate with one or more core networks through a radio access network (RAN). The user equipment may be a mobile terminal such as a mobile phone (or referred to as a "cellular" phone) or a computer with a mobile terminal device. For example, the user equipment may be a portable, pocket-sized, handheld, computer built-in, or in-vehicle mobile apparatus.

An access network device may be an apparatus deployed in a radio access network for providing a wireless communication function for the terminal device. The access network device may include macro base stations, micro base stations (also referred to as small cells), relay nodes, access points, and the like in various forms, and may also include control nodes in various forms, such as a network controller. The control node may be connected to a plurality of base stations, and configure resources for a plurality of terminal devices that fall within coverage of the plurality of base stations. In systems using different radio access technologies, devices having a function of the access network device may have different names, for example, may correspond to a base station and a base station controller in 2G, or correspond to a base station and an RNC in 3G; or an eNB or eNodeB in LTE, or may be a base station (currently, there is no official name, for example, a G-NB or an NX-NB) in 5G or NR, or a transmission reception point (TRP). This is not limited in the present invention.

A core network device may be a device used in a network after the access network device, and is usually connected to the access network device, and there may be a plurality of core network devices based on functions. In systems using different radio access technologies, devices having a function of the core network device may have different names, for example, may correspond to an MME or an S-GW in LTE, or correspond to an SGSN/GGSN in 3G, and has no official name in 5G, such as an NG-Core.

First Embodiment

An embodiment of the present invention provides a handover method. The method is applied to a communications system shown in FIG. 3. The communications system includes a terminal device, an access network device, a first core network device, and a second core network device. The first core network device and the second core network device communicate with the terminal device by using the same access network device. Further, the first core network device and the second core network device may use different core network technologies. For example, the first core network device may use an LTE core network technology, and the second core network device may use a 5G core network technology. For another example, the first core network device may use the 5G core network technology, and the second core network device may use the LTE core network technology.

Figure 3:
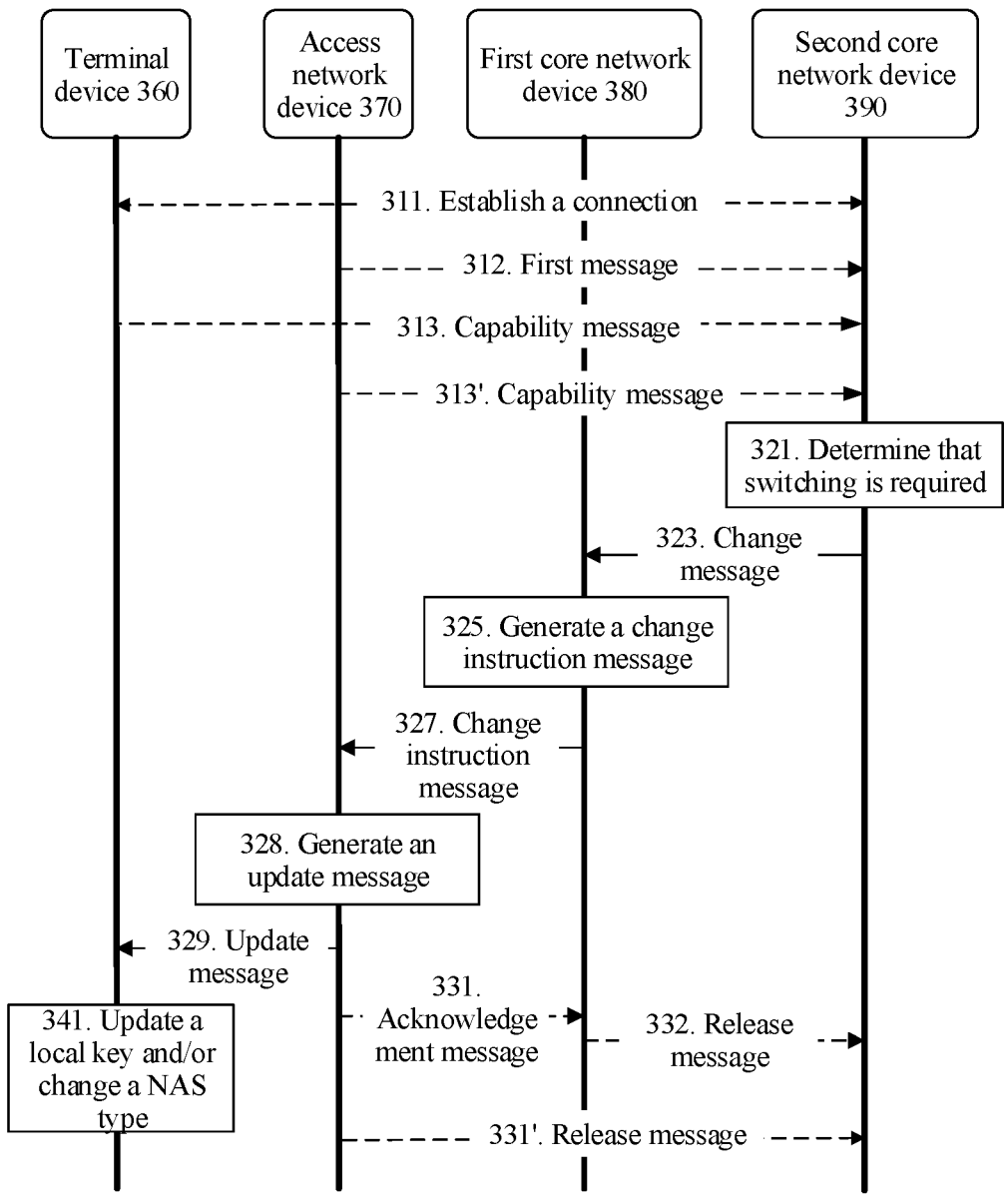
FIG. 3 is a schematic flowchart of a handover method according to an embodiment of the present invention.
Figures 1, 3:
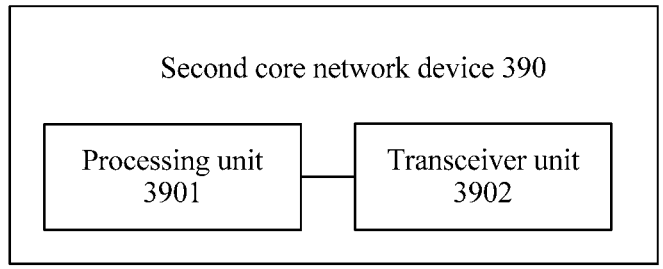
Figures 2, 3:
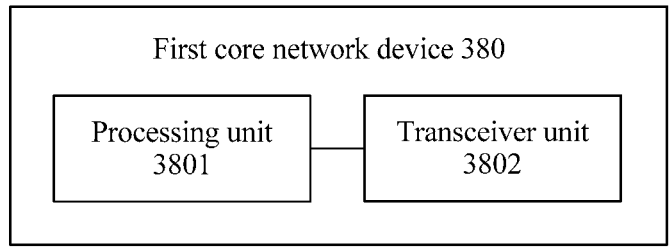
Figure 3:
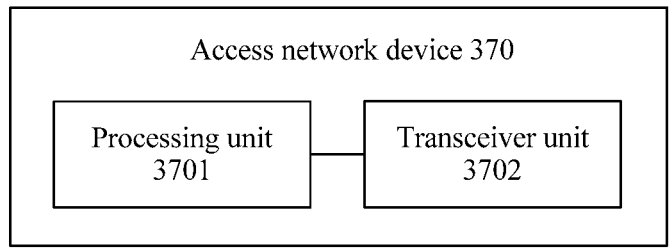

As shown in FIG. 3, the method includes the following steps.

311. The terminal device establishes a connection to the second core network device. The terminal device may establish the connection to the second core network device in a known manner. Usually, the terminal device establishes the connection to the second core network device by using the access network device. However, a person skilled in the art may understand that the connection may be established in another manner. For example, the terminal device directly sends a message to the second core network device.

312. The access network device sends a first message to the second core network device, where the first message includes information about a route distinguisher of the first core network device or information about an identifier of the access network device in a first core network. The information about the route distinguisher of the first core network device is used to indicate a route of a message that is to be sent by the second core network device to the first core network device. For example, the information about the route distinguisher of the first core network device may be information that includes a tracking area code TAC. The information about the identifier of the access network device in the first core network may be information about the identifier of the access network device when the access network device communicates with the first core network device. It may be understood that the information about the identifier may be the identifier, or may be an index or other information. It should be noted that the information about the route distinguisher of the first core network device and the information about the identifier of the access network device in the first core network are information that can be used by the second core network device, and do not necessarily need to be sent by using the first message. It may be understood that, when the second core network device may obtain one of the two pieces of information in another manner, for example, through an agreement, the first message may not include the piece of information that can be learned of by the second core network device. Certainly, the first message may alternatively include the information about the route distinguisher of the first core network device and the information about the identifier of the access network device in the first core network. It may be understood that because the first core network device and the second core network device communicate with the terminal device by using the same access network device, the access network device learns of related information of the first core network device, namely, information that may be included in the first message.

313. The second core network device receives a capability message, where the capability message is used to indicate that the terminal device supports the terminal device in establishing a connection to the first core network device. It may be understood that the capability message may be sent by the terminal device to the second core network device, or may be sent by the access network device to the second core network device. For example, the capability message may be a non-access stratum NAS message.

321. The second core network device determines that a connection between the terminal device and the second core network device needs to be switched to a connection between the terminal device and the first core network device. Further, the second core network device may determine, based on a condition of the second core network device, that the switching is required. For example, no more services can be accepted based on a load status of the second core network device. For example, a threshold is exceeded for a condition. Alternatively, the switching may be triggered based on an event, for example, an event that a message sent by another network element is received.

323. The second core network device sends a change message to the first core network device, where the change message is used to notify the first core network device that the connection between the terminal device and the second core network device needs to be switched to the connection between the terminal device and the first core network device. Optionally, the change message includes at least one or a combination of the following content: a first key of the terminal device, the information about the identifier of the access network device in the first core network, and information about an identifier of the terminal device on a second core network interface. Because the second core network device has established the connection to the terminal device, the second core network device has stored the first key of the terminal device. The second core network device may obtain, based on the information about the route distinguisher of the first core network device, a route for sending the change message to the first core network device. Further, the second core network device sends the change message after generating the message. The information about the identifier of the terminal device on the second core network interface may be used to indicate which terminal device needs to be processed. The identifier of the terminal device on the second core network interface includes an identifier used to identify the terminal device on an interface through which the access network device communicates with the second core network device, for example, may be an S1 AP UE ID.

The second core network device may notify, by using the change message, another network element that the switching is required, and trigger a subsequent procedure.

325. The first core network device generates a change instruction message, where the change instruction message is used to instruct the access network device to instruct the terminal device to perform an update. Optionally, the change instruction message includes a second key of the terminal device and/or the information about the identifier of the terminal device on the second core network interface, and the second key is obtained based on the first key.

After receiving the change message, the first core network device may learn that the first core network device is to accept a task of establishing a connection to the terminal device, and correspondingly, the first core network device prepares a resource to prepare to establish communication with the terminal device. If the first core network device determines that the first core network device cannot accept the task, the first core network device may feed back a reject message to the second core network device (not shown), and the second core network device then searches for another core network device or another processing manner based on the reject message (not shown).

The first key is a key that is used for communication between the terminal device and the second core network device and that is adapted to a second core network technology. The first core network device deduces the adapted second key of the terminal device in the first core network based on the first key of the terminal device by using a core network technology of the first core network device.

327. The first core network device sends the change instruction message to the access network device. Further, the first core network device may send the change instruction message to the access network device based on the information about the identifier of the access network device in the first core network.

328. The access network device generates an update message, where the update message is used to instruct the terminal device to perform an update, and optionally, the update message is used to instruct the terminal device to update a NAS type and/or update a key of the terminal device. The updated key of the terminal device is obtained based on a local key stored on the terminal device. Optionally, a new key is deduced from the local key by using a deduction method that is the same as that of the first core network device.

The access network device may learn of, based on the information about the identifier of the terminal device on the second core network interface, a terminal device that needs to update a key. The access network device receives and locally stores the second key, so as to use the second key when communicating with the terminal device.

329. The access network device notifies the terminal device of the update message.

341. The terminal device updates the local key and/or changes the non-access stratum NAS type based on the update message. The updating a NAS type includes: updating a NAS type used for communication with the second core network device to a NAS type used for communication with the first core network device; and the updating a key of the terminal device includes: updating the first key used for communication with the second core network device to the second key used for communication with the first core network device. Further, the local key of the terminal device is used for communication with the second core network device, and the key needs to be updated now. To be specific, there is a mapping relationship between the local key of the terminal device and the first key of the terminal device on the second core network device. The mapping relationship may be that the first key is the same as the second key or the first key may be obtained through an operation. Because the first core network device has updated the first key on a network side to the second key that meets a requirement of the first core network device, the terminal device needs to obtain the new key in a corresponding deduction manner, so as to meet a requirement for communication with the first core network device. Correspondingly, an original NAS type also needs to be updated to meet a requirement for communication with the first core network device instead of meeting a requirement for communication with the second core network device. For example, a NAS type of 5G is updated to a NAS type of 4G.

331. The access network device sends an acknowledgement message to the first core network device, where the acknowledgement message is used to indicate that the access network device and the terminal device complete the switching.

332. The first core network device sends a release message to the second core network device, where the release message is used to instruct the second core network device to release the connection between the terminal device and the second core network device.

The method may further include step 331' as an alternative to steps 331 and 332: The access network device sends a release message to the second core network device, where the release message is used to instruct the second core network device to release the connection between the terminal device and the second core network device.

Further, the second core network device releases the connection between the terminal device and the second core network device (not shown).

Based on a handover procedure initiated by the second core network device, the connection between the terminal device and the second core network device may be switched to the connection between the terminal device and the first core network device without switching of the access network device, so that a network communication requirement is efficiently met.

Further, in a network communication process, the terminal device updates the key of the terminal device and a used communication protocol in a timely manner, to successfully complete the switching.

In the flowchart of FIG. 3, a dashed line indicates that the step is optional. To be specific, one or a combination of steps 311, 312, 313, and 313' may be omitted, and one or a combination of steps 331, 332, and 331' may be omitted. Specifically, when the second core network device has learned of the information about the route distinguisher of the first core network device or the information about the identifier of the access network device in the first core network, step 312 may be omitted, in other words, the first message does not need to be transmitted. When the second core network device has learned that the terminal device supports the terminal device in establishing the connection to the first core network device, steps 313 and 313' may be omitted, in other words, the capability information does not need to be transmitted. When the second core network device has a proper mechanism, for example, a timeout mechanism, to release the connection between the terminal device and the second core network device, steps 331, 332, and 331' may be omitted, in other words, the release message does not need to be transmitted to release a resource. It may be understood that omitting the foregoing steps does not affect a technical effect of the solution in FIG. 3, and does not affect functions of various network elements.

For various network elements in FIG. 3, the following different methods may be obtained. The following methods are consistent with the method in FIG. 3, and details are not described again for a same part. The steps and the related descriptions of the method in FIG. 3 may provide reference and have similar advantages to the following methods. For brevity of description, details are not described again. It may be understood that in the following methods, the first core network device and the second core network device communicate with the terminal device by using the same access network device.

A handover method is used by the second core network device and includes the following steps.

321. The second core network device determines that a connection between the terminal device and the second core network device needs to be switched to a connection between the terminal device and the first core network device.

323. The second core network device sends a change message to the first core network device, where the change message is used to notify the first core network device that the connection between the terminal device and the second core network device needs to be switched to the connection between the terminal device and the first core network device. Optionally, the change message includes at least one or a combination of the following content: a first key of the terminal device, information about an identifier of the access network device in a first core network, and information about an identifier of the terminal device on a second core network interface.

The second core network device determines that the switching is required, and sends the change message, to trigger a handover procedure and enable another network element to prepare for the switching. Therefore, a requirement of a network is met. In the network, the first core network device and the second core network device communicate with the terminal device by using the same access network device.

Further, the handover method further includes the following step: 311. The terminal device establishes a connection to the second core network device.

Further, the handover method further includes:
receiving, by the second core network device, a first message, where the first message includes information about a route distinguisher of the first core network device or the information about the identifier of the access network device in the first core network; and/or
receiving, by the second core network device, a capability message, where the capability message is used to indicate that the terminal device supports the terminal device in establishing a connection to the first core network device.

The second core network device may learn of required information in a handover procedure by using the first message or the capability message, to prepare well for the handover procedure.

Further, the handover method further includes:
receiving, by the second core network device, a release message, where the release message is used to instruct the second core network device to release the connection between the terminal device and the second core network device.

Further, the handover method further includes:
releasing, by the second core network device, the connection between the terminal device and the second core network device.

The second core network device may complete resource release by using the foregoing release procedure, to save resources.

A handover method is used by the first core network device and includes:
receiving, by the first core network device, a change message, where the change message is used to notify the first core network device that a connection between the terminal device and the second core network device needs to be switched to a connection between the terminal device and the first core network device. Optionally, the change message includes at least one or a combination of the following content: a first key of the terminal device, information about an identifier of the access network device in a first core network, and information about an identifier of the terminal device on a second core network interface.

325. The first core network device generates a change instruction message, where the change instruction message is used to instruct the access network device to instruct the terminal device to perform an update. The change instruction message may include a second key of the terminal device and/or the information about the identifier of the terminal device on the second core network interface, and the second key is obtained based on the first key.

327. The first core network device sends the change instruction message to the access network device.

The first core network device may learn, by receiving the change message, that the first core network device needs to connect to the terminal device, and the first core network device may notify, by using the change instruction message, another network element that the first core network device and the second core network device prepare well for the switching, to meet a requirement of a network. In the network, the first core network device and the second core network device communicate with the terminal device by using the same access network device.

Further, the handover method further includes:

receiving, by the first core network device, an acknowledgement message, where the acknowledgement message is used to indicate that the access network device and the terminal device complete the switching.

332. The first core network device sends a release message to the second core network device, where the release message is used to instruct the second core network device to release the connection between the terminal device and the second core network device.

Based on the foregoing release procedure, the first core network device may help the second core network device complete resource release, to save resources.

A handover method is used by the access network device and includes:

receiving, by the access network device, a change instruction message, where the change instruction message is used to instruct the access network device to instruct the terminal device to perform an update. Optionally, the change instruction message includes a second key of the terminal device and/or information about an identifier of the terminal device on a second core network interface.

328. The access network device generates an update message, where the update message is used to instruct the terminal device to perform an update. Optionally, the update message is used to instruct the terminal device to update a NAS type and/or update a key of the terminal device.

329. The access network device notifies the terminal device of the update message.

The access network device may learn, by receiving the change instruction message, that the second core network device and the first core network device prepare well for switching. The access network device may start an update procedure on a terminal side by generating and sending the update message, to meet a requirement of a network. In the network, the first core network device and the second core network device communicate with the terminal device by using the same access network device.

Further, the handover method further includes:

sending, by the access network device, a first message, where the first message includes information about a route distinguisher of the first core network device or information about an identifier of the access network device in a first core network.

The access network device may notify another network element of required information in a handover procedure by using the first message, to prepare well for the handover procedure.

Further, the handover method further includes the following step:

331. The access network device sends an acknowledgement message to the first core network device, where the acknowledgement message is used to indicate that the access network device and the terminal device complete switching.

Further, the handover method further includes the following step:

331'. The access network device sends a release message to the second core network device, where the release message is used to instruct the second core network device to release a connection between the terminal device and the second core network device.

Based on the foregoing release procedure, the access network device may help the second core network device complete resource release, to save resources.

A handover method is used by the terminal device and includes:

receiving, by the terminal device, an update message, where the update message is used to instruct the terminal device to perform an update, and optionally, the update message is used to instruct the terminal device to update a NAS type and/or update a key of the terminal device; and updating, by the terminal device, the NAS type and/or updating the key of the terminal device.

The updating a NAS type includes: updating a NAS type used for communication with the second core network device to a NAS type used for communication with the first core network device; and the updating a key of the terminal device includes: updating a first key used for communication with the second core network device to a second key used for communication with the first core network device.

The terminal device may complete, by using the update message and completing a corresponding update action, a handover from the second core network device to the first core network device, to meet a requirement of a network. In the network, the first core network device and the second core network device communicate with the terminal device by using the same access network device.

Further, the handover method further includes:

sending, by the terminal device, a capability message, where the capability message is used to indicate that the terminal device supports the terminal device in establishing a connection to the first core network device.

The terminal device notifies, by using the capability information, another network element that the terminal device may support communication with the first core network device, to prepare well for switching.

An embodiment of the present invention provides a communications system. The communications system includes a terminal device, an access network device, a first core network device, and a second core network device. The first core network device and the second core network device communicate with the terminal device by using the same access network device. The system may use the handover method shown in FIG. 3. Further, the first core network device and the second core network device may use different core network technologies. For example, the first core network device may be a core network device that uses an LTE core network technical specification, and the second core network device may be a core network device that uses a 5G core network technical specification.

The following devices may be related to the steps of the method described in FIG. 3. Therefore, the steps and the related descriptions of the method in FIG. 3 may provide reference and have similar advantages to the following devices. For brevity of description, details are not described again. It may be understood that in the following embodiments, the first core network device and the second core network device communicate with the terminal device by using the same access network device.

Figure 1:
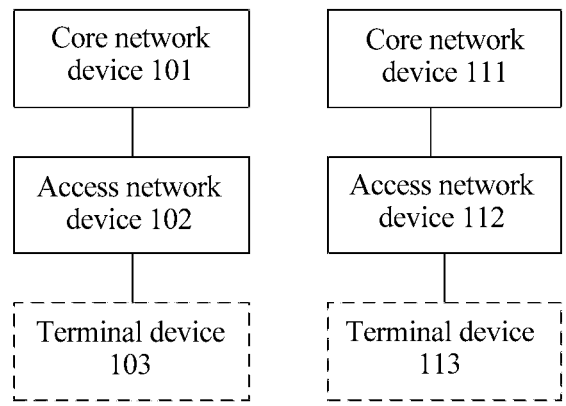
FIG. 1 is a schematic diagram of two existing communications systems.

As shown in FIG. 3-1, a second core network device 390 includes:

a processing unit 3901, configured to determine that a connection between a terminal device and the second core network device needs to be switched to a connection between the terminal device and a first core network device, where the first core network device and the second core network device communicate with the terminal device by using a same access network device; and a transceiver unit 3902, configured to send a change message to the first core network device, where the change message is used to notify the first core network device that the connection between the terminal device and the second core network device needs to be switched to the connection between the terminal device and the first core network device.

Optionally, the change message includes at least one or a combination of the following content: a first key of the terminal device, information about an identifier of the access network device in a first core network, and information about an identifier of the terminal device on a second core network interface.

The second core network device determines that the switching is required, and sends the change message, to trigger a handover procedure and enable another network element to prepare for the switching. Therefore, a requirement of a network is met. In the network, the first core network device and the second core network device communicate with the terminal device by using the same access network device.

Further, in the second core network device, the terminal device establishes a connection to the second core network device.

Further, in the second core network device, the transceiver unit is configured to receive a first message, where the first message includes information about a route distinguisher of the first core network device or the information about the identifier of the access network device in the first core network; and/or the transceiver unit is configured to receive a capability message, where the capability message is used to indicate that the terminal device supports the terminal device in establishing a connection to the first core network device.

The second core network device may learn of required information in a handover procedure by using the first message or the capability message, to prepare well for the handover procedure.

Further, in the second core network device, the transceiver unit is configured to receive a release message, where the release message is used to instruct the second core network device to release the connection between the terminal device and the second core network device.

Further, in the second core network device, the processing unit is configured to release the connection between the terminal device and the second core network device.

The second core network device may complete resource release by using the foregoing release procedure, to save resources.

As shown in FIG. 3-2, a first core network device 380 includes:

a transceiver unit 3802, configured to receive a change message, where the change message is used to notify the first core network device that a connection between a terminal device and a second core network device needs to be switched to a connection between the terminal device and the first core network device, and the first core network device and the second core network device communicate with the terminal device by using a same access network device; and optionally, the change message includes at least one or a combination of the following content: a first key of the terminal device, information about an identifier of the access network device in a first core network, and information about an identifier of the terminal device on a second core network interface; and a processing unit 3801, configured to generate a change instruction message, where the change instruction message is used to instruct the access network device to instruct the terminal device to perform an update; and optionally, the change instruction message includes a second key of the terminal device and/or the information about the identifier of the terminal device on the second core network interface, and the second key is obtained based on the first key.

The transceiver unit 3802 is further configured to send the change instruction message to the access network device.

The first core network device may learn, by receiving the change message, that the first core network device needs to connect to the terminal device, and the first core network device may notify, by using the change instruction message, another network element that the first core network device and the second core network device prepare well for the switching, to meet a requirement of a network. In the network, the first core network device and the second core network device communicate with the terminal device by using the same access network device.

Further, in the first core network device, the transceiver unit is configured to receive an acknowledgement message, where the acknowledgement message is used to indicate that the access network device and the terminal device complete the switching; and the transceiver unit is configured to send a release message to the second core network device, where the release message is used to instruct the second core network device to release the connection between the terminal device and the second core network device.

Based on the foregoing release procedure, the first core network device may help the second core network device complete resource release, to save resources.

As shown in FIG. 3-3, an access network device 370 includes:

a transceiver unit 3702, configured to receive a change instruction message, where the change instruction message is used to instruct the access network device to instruct a terminal device to perform an update, and a first core network device and a second core network device communicate with the terminal device by using the access network device; and optionally, the change instruction message includes a second key of the terminal device and/or information about an identifier of the terminal device on a second core network interface; and a processing unit 3701, configured to generate an update message, where the update message is used to instruct the terminal device to perform an update, and optionally, the update message is used to instruct the terminal device to update a NAS type and/or update a key of the terminal device.

The transceiver unit 3702 is further configured to send the update message to the terminal device.

The access network device may learn, by receiving the change instruction message, that the second core network device and the first core network device prepare well for switching. The access network device may start an update procedure on a terminal side by generating and sending the update message, to meet a requirement of a network. In the network, the first core network device and the second core network device communicate with the terminal device by using the same access network device.

Further, in the access network device, the processing unit 3701 is configured to generate a first message, where the first message includes information about a route distinguisher of the first core network device or information about an identifier of the access network device in a first core network; and the transceiver unit 3702 is configured to send the first message.

The access network device may notify another network element of required information in a handover procedure by using the first message, to prepare well for the handover procedure.

Further, in the access network device, the processing unit 3701 is configured to generate an acknowledgement message, where the acknowledgement message is used to indicate that the access network device and the terminal device complete switching; and the transceiver unit 3702 is configured to send the acknowledgement message to the first core network device.

Further, in the access network device, the processing unit 3701 is configured to generate a release message, where the release message is used to instruct the second core network device to release a connection between the terminal device and the second core network device; and the transceiver unit 3702 is configured to send the release message to the second core network device.

Based on the foregoing release procedure, the access network device may help the second core network device complete resource release, to save resources.

Figures 3, 4:
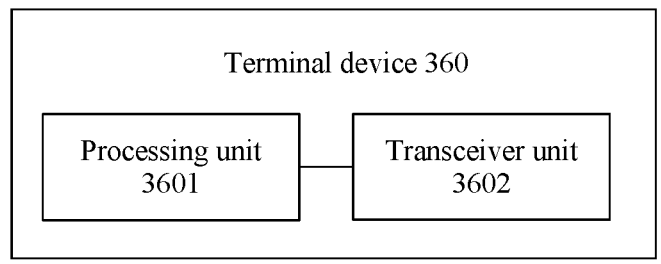
Figure 4:
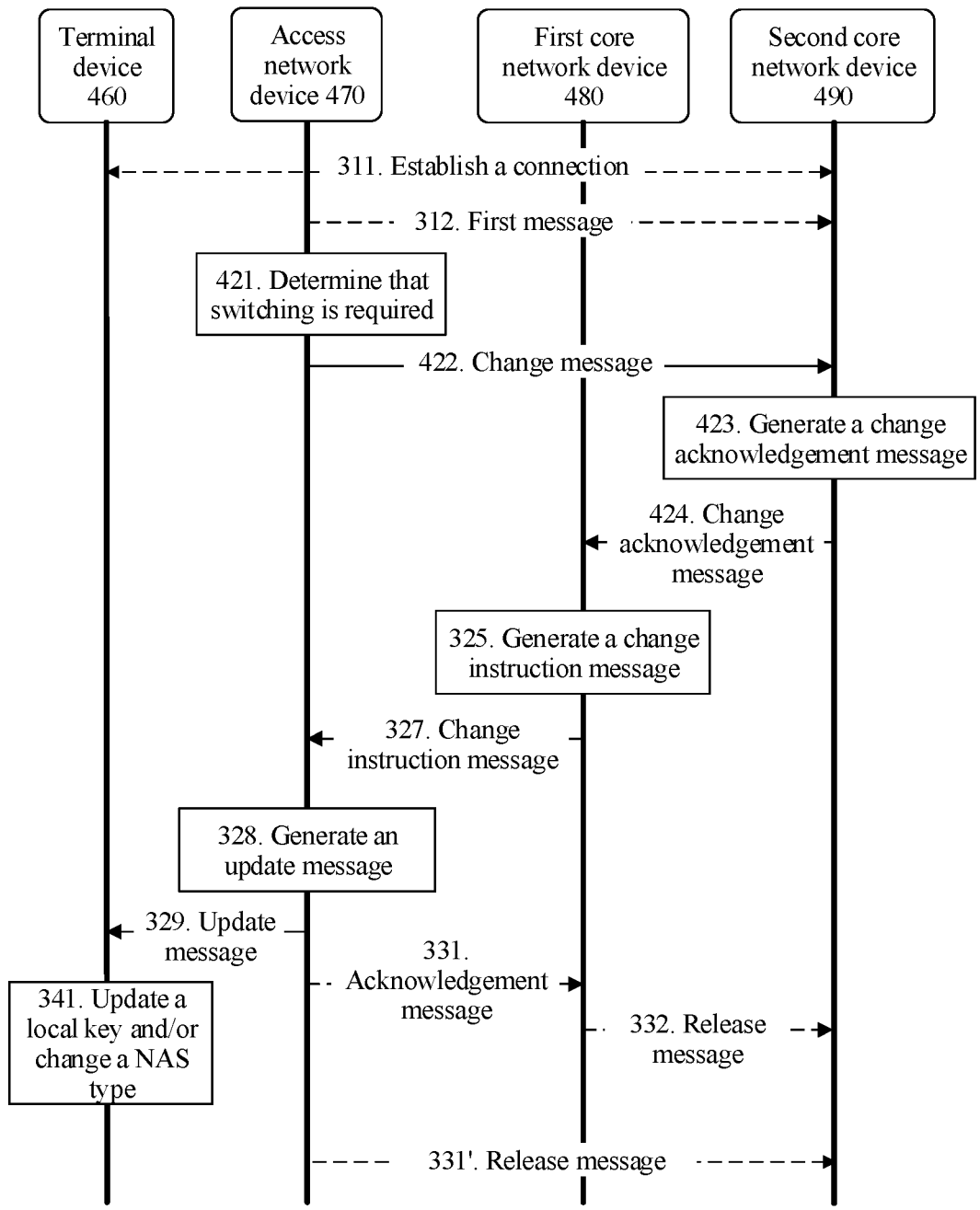
Figures 1, 4:
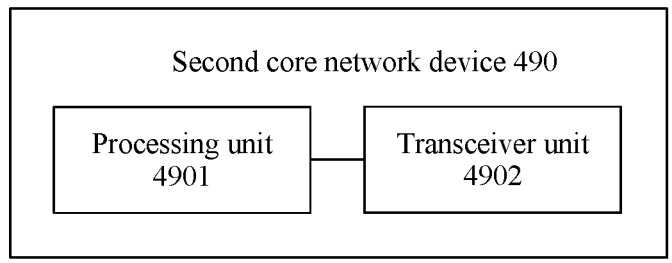
Figures 2, 4:
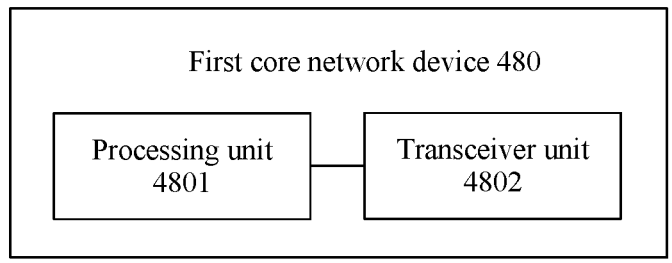
Figures 3, 4:
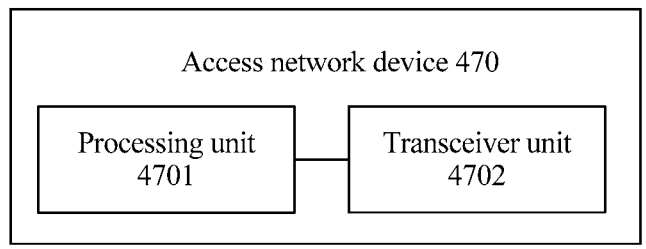
Figure 4:
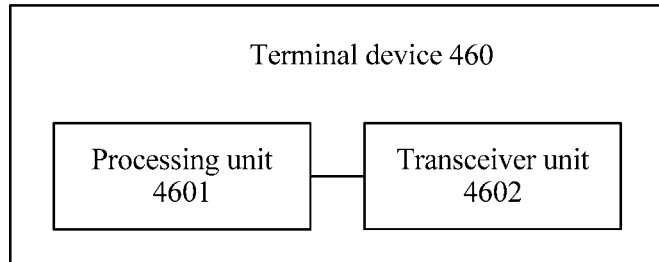

As shown in FIG. 3-4, a terminal device includes:

a transceiver unit 3602, configured to receive an update message, where the update message is used to instruct the terminal device to update a NAS type and/or update a key of the terminal device; and a processing unit 3601, configured to update the NAS type and/or update the key of the terminal device, where the updating a NAS type includes: updating a NAS type used for communication with a second core network device to a NAS type used for communication with a first core network device;

the updating a key of the terminal device includes: updating a first key used for communication with the second core network device to a second key used for communication with the first core network device; and the first core network device and the second core network device communicate with the terminal device by using a same access network device.

The terminal device may complete, by using the update message and completing a corresponding update action, a handover from the second core network device to the first core network device, to meet a requirement of a network. In the network, the first core network device and the second core network device communicate with the terminal device by using the same access network device.

Further, in the terminal device, the processing unit is configured to generate a capability message, where the capability message is used to indicate that the terminal device supports the terminal device in establishing a connection to the first core network device; and the transceiver unit is configured to send the capability message.

The terminal device notifies, by using the capability message, another network element that the terminal device may support communication with the first core network device, to prepare well for switching.

Second Embodiment

An embodiment of the present invention provides a handover method. The method is applied to a communications system shown in FIG. 4. The communications system includes a terminal device, an access network device, a first core network device, and a second core network device. The first core network device and the second core network device communicate with the terminal device by using the same access network device. It can be learned that the second embodiment is basically similar to the first embodiment. A difference lies in that, in the first embodiment, the second core network device determines that a connection between the terminal device and the second core network device needs to be switched to a connection between the terminal device and the first core network device, but in the second embodiment, the access network device determines that the switching is required.

Based on a handover procedure initiated by the access network device, the connection between the terminal device and the second core network device may be switched to the connection between the terminal device and the first core network device without switching of the access network device, so that a network communication requirement is efficiently met.

For brevity of description, a same reference numeral is used for a same part in FIG. 4 and FIG. 3. Therefore, details are not described again. Different parts such as steps 421, 422, 423, and 424 are described in detail. It may be understood that the related descriptions in FIG. 3 may be used to explain the technical solution in FIG. 4.

As shown in FIG. 4, the method includes the following steps.

311. The terminal device establishes a connection to the second core network device by using the access network device.

312. The access network device sends a first message to the second core network device, where the first message includes information about a route distinguisher of the first core network device or information about an identifier of the access network device in a first core network.

421. The access network device determines that a connection between the terminal device and the second core network device needs to be switched to a connection between the terminal device and the first core network device. Further, the access network device may initiate the switching based on a condition of the access network or a status of the second core network device. For example, the access network device speculates that no more services can be accepted based on a load status of the second core network device. Alternatively, the access network device receives a message of the second core network device and is notified that the switching is required, and in this case, the access network device actively determines that the switching is required. It may be understood that the access network device may alternatively receive a message sent by another network element, to trigger the switching.

422. The access network device sends a change message to the second core network device, where the change message is used to notify the second core network device that the connection between the terminal device and the second core network device needs to be switched to the connection between the terminal device and the first core network device. Optionally, the change message includes information about an identifier of the terminal device on a second core network interface. The identifier of the terminal device on the second core network interface is an identifier used to identify the terminal device on an interface through which the access network device communicates with the second core network device.

Optionally, the change message may include the information about the route distinguisher of the first core network device and/or the information about the identifier of the access network device in the first core network. It may be understood that the two types of information are used by the second core network device. If the second core network device has learned of the information or a part of the information in another manner, it is unnecessary to send the known information by using step 312 or step 422. It may be understood that one or both of the information about the route distinguisher of the first core network device and the information about the identifier of the access network device in the first core network may be sent by using the first message in step 312. In this case, the change message in step 422 may not include information that has been sent by using the first message. Alternatively, one or both of the information about the route distinguisher of the first core network device and the information about the identifier of the access network device in the first core network may be sent by using the change message in step 422. In this case, the first message in step 312 may not include information that needs to be sent by using the change message, or even step 312 is omitted.

423. The second core network device generates a change acknowledgement message, where the change acknowledgement message is used to notify the first core network device that the connection between the terminal device and the second core network device needs to be switched to the connection between the terminal device and the first core network device. Optionally, the change acknowledgement message includes one or a combination of the following three items: a first key of the terminal device, the information about the identifier of the access network device in the first core network, and the information about the identifier of the terminal device on the second core network interface. The second core network device receives the change message, learns that the connection between the terminal device and the second core network device needs to be switched to the connection between the terminal device and the first core network device, and correspondingly prepares a communication resource. To enable the first core network device to successfully connect to the terminal device, the second core network device sends corresponding information. The first key of the terminal device, the information about the identifier of the access network device in the first core network, and the information about the identifier of the terminal device on the second core network interface are similar to or consistent with those in the solution in FIG. 3. Details are not described again.

424. The second core network device sends the change acknowledgement message to the first core network device.

Optionally, the second core network device may find the first core network device based on the information about the route distinguisher of the first core network device.

325. The first core network device generates a change instruction message, where the change instruction message is used to instruct the access network device to instruct the terminal device to perform an update. Optionally, the change instruction message includes a second key of the terminal device and/or the information about the identifier of the terminal device on the second core network interface, and the second key is obtained based on the first key.

327. The first core network device sends the change instruction message to the access network device.

328. The access network device generates an update message, where the update message is used to instruct the terminal device to update a NAS type and/or update a key of the terminal device. The updated key of the terminal device is obtained based on a local key stored on the terminal device.

329. The access network device notifies the terminal device of the update message, where the update message is used to instruct the terminal device to perform an update, and optionally, the update message is used to instruct the terminal device to update the NAS type and/or update the key of the terminal device.

341. The terminal device updates the local key and/or changes the non-access stratum NAS type based on the update message.

331. The access network device sends an acknowledgement message to the first core network device, where the acknowledgement message is used to indicate that the access network device and the terminal device complete the switching.

332. The first core network device sends a release message to the second core network device, where the release message is used to instruct the second core network device to release the connection between the terminal device and the second core network device.

The method may further include step 331' as an alternative to steps 331 and 332: The access network device sends a release message to the second core network device, where the release message is used to instruct the second core network device to release the connection between the terminal device and the second core network device.

Further, the second core network device releases the connection between the terminal device and the second core network device (not shown).

Based on a handover procedure initiated by the access network device, the connection between the terminal device and the second core network device may be switched to the connection between the terminal device and the first core network device without switching of the access network device, so that a network communication requirement is efficiently met.

In the flowchart of FIG. 4, a dashed line indicates that the step is optional. To be specific, one or a combination of steps 311, 312, 313, and 313' may be omitted, and one or a combination of steps 331, 332, and 331' may be omitted.

For various network elements in FIG. 4, the following different methods may be obtained. The following methods are consistent with the method in FIG. 4, and details are not described again for a same part. The steps and the related descriptions of the methods in FIG. 3 and FIG. 4 may provide reference and have similar advantages to the following methods. For brevity of description, details are not described again. It may be understood that in the following methods, the first core network device and the second core network device communicate with the terminal device by using the same access network device.

A handover method is used by the second core network device and includes:

receiving, by the second core network device, a change message, where the change message is used to notify the second core network device that a connection between the terminal device and the second core network device needs to be switched to a connection between the terminal device and the first core network device. Optionally, the change message includes information about an identifier of the terminal device on a second core network interface, and the identifier of the terminal device on the second core network interface is an identifier used to identify the terminal device on an interface through which the access network device communicates with the second core network device.

423. The second core network device generates a change acknowledgement message, where the change acknowledgement message is used to notify the first core network device that the connection between the terminal device and the second core network device needs to be switched to the connection between the terminal device and the first core network device. Optionally, the change acknowledgement message includes one or a combination of the following three items: a first key of the terminal device, information about an identifier of the access network device in a first core network, and the information about the identifier of the terminal device on the second core network interface.

424. The second core network device sends the change acknowledgement message to the first core network device.

The second core network device sends the change message, to trigger a handover procedure and enable another network element to prepare for the switching. Therefore, a requirement of a network is met. In the network, the first core network device and the second core network device communicate with the terminal device by using the same access network device.

Further, the handover method further includes the following step: 311. The terminal device establishes a connection to the second core network device.

Further, the handover method further includes:

receiving, by the second core network device, a first message, where the first message includes information about a route distinguisher of the first core network device or the information about the identifier of the access network device in the first core network.

The second core network device may learn of required information in a handover procedure by using the first message, to prepare well for the handover procedure.

Further, the handover method further includes:

receiving, by the second core network device, a release message, where the release message is used to instruct the second core network device to release the connection between the terminal device and the second core network device.

Further, the handover method further includes:

releasing, by the second core network device, the connection between the terminal device and the second core network device.

The second core network device may complete resource release by using the foregoing release procedure, to save resources.

A handover method is used by the first core network device and includes:

receiving, by the first core network device, a change acknowledgement message, where the change acknowledgement message is used to notify the first core network device that a connection between the terminal device and the second core network device needs to be switched to a connection between the terminal device and the first core network device. Optionally, the change acknowledgement message includes one or a combination of the following three items: a first key of the terminal device, information about an identifier of the access network device in a first core network, and information about an identifier of the terminal device on a second core network interface.

325. The first core network device generates a change instruction message, where the change instruction message is used to instruct the access network device to instruct the terminal device to perform an update. Optionally, the change instruction message includes a second key of the terminal device and/or the information about the identifier of the terminal device on the second core network interface, and the second key is obtained based on the first key.

327. The first core network device sends the change instruction message to the access network device.

The first core network device may learn, by receiving the change acknowledgement message, that the first core network device needs to connect to the terminal device, and the first core network device may notify, by using the change instruction message, another network element that the first core network device and the second core network device prepare well for the switching, to meet a requirement of a network. In the network, the first core network device and the second core network device communicate with the terminal device by using the same access network device.

Further, the handover method further includes:

receiving, by the first core network device, an acknowledgement message, where the acknowledgement message is used to indicate that the access network device and the terminal device complete the switching.

332. The first core network device sends a release message to the second core network device, where the release message is used to instruct the second core network device to release the connection between the terminal device and the second core network device.

Based on the foregoing release procedure, the first core network device may help the second core network device complete resource release, to save resources.

A handover method is used by the access network device and includes the following steps.

421. The access network device determines that a connection between the terminal device and the second core network device needs to be switched to a connection between the terminal device and the first core network device.

422. The access network device sends a change message to the second core network device, where the change message is used to notify the second core network device that the connection between the terminal device and the second core network device needs to be switched to the connection between the terminal device and the first core network device. The change message includes information about an identifier of the terminal device on a second core network interface, and the identifier of the terminal device on the second core network interface is an identifier used to identify the terminal device on an interface through which the access network device communicates with the second core network device.

The access network device determines that the switching is required, and sends the change message, to trigger a handover procedure and enable another network element to prepare for the switching. Therefore, a requirement of a network is met. In the network, the first core network device and the second core network device communicate with the terminal device by using the same access network device.

Further, the handover method further includes:

sending, by the access network device, a first message, where the first message includes information about a route distinguisher of the first core network device or information about an identifier of the access network device in a first core network.

The access network device may notify another network element of required information in a handover procedure by using the first message, to prepare well for the handover procedure.

Further, the handover method further includes:

receiving, by the access network device, a change instruction message, where the change instruction message is used to instruct the access network device to instruct the terminal device to perform an update. Optionally, the change instruction message includes a second key of the terminal device and/or the information about the identifier of the terminal device on the second core network interface.

328. The access network device generates an update message, where the update message is used to instruct the terminal device to perform an update, and optionally, the update message is used to instruct the terminal device to update a NAS type and/or update a key of the terminal device. The updated key of the terminal device is obtained based on a local key stored on the terminal device.

329. The access network device notifies the terminal device of the update message.

The access network device may learn, by receiving the change instruction message, that the second core network device and the first core network device prepare well for the switching. The access network device may start an update procedure on a terminal side by generating and sending the update message, to meet a requirement of a network.

Further, the handover method further includes the following step:

331. The access network device sends an acknowledgement message to the first core network device, where the acknowledgement message is used to indicate that the access network device and the terminal device complete the switching.

Further, the handover method further includes the following step:

331'. The access network device sends a release message to the second core network device, where the release message is used to instruct the second core network device to release the connection between the terminal device and the second core network device.

The second core network device may complete resource release by using the foregoing release procedure, to save resources.

A handover method is used by the terminal device and includes:

receiving, by the terminal device, an update message, where the update message is used to instruct the terminal device to perform an update, and optionally, the update message is used to instruct the terminal device to update a NAS type and/or update a key of the terminal device; and updating, by the terminal device, the NAS type and/or updating the key of the terminal device.

The updating a NAS type includes: updating a NAS type used for communication with the second core network device to a NAS type used for communication with the first core network device; and the updating a key of the terminal device includes: updating a first key used for communication with the second core network device to a second key used for communication with the first core network device.

The terminal device may complete, by using the update message and completing a corresponding update action, a handover from the second core network device to the first core network device, to meet a requirement of a network. In the network, the first core network device and the second core network device communicate with the terminal device by using the same access network device.

An embodiment of the present invention provides a communications system. The communications system includes a terminal device, an access network device, a first core network device, and a second core network device. The first core network device and the second core network device communicate with the terminal device by using the same access network device. The system may use the handover method shown in FIG. 4. Further, the first core network device and the second core network device may use different core network technologies. Refer to the explanation in FIG. 3.

The following devices may be related to the steps of the method described in FIG. 4. Therefore, the steps and the related descriptions of the methods in FIG. 3 and FIG. 4 may provide reference and have similar advantages to the following devices. For brevity of description, details are not described again. It may be understood that in the following embodiments, the first core network device and the second core network device communicate with the terminal device by using the same access network device.

As shown in FIG. 4-1, a second core network device 490 includes:

a transceiver unit 4902, configured to receive a change message, where the change message is used to notify the second core network device that a connection between a terminal device and the second core network device needs to be switched to a connection between the terminal device and the first core network device; and optionally, the change message includes information about an identifier of the terminal device on a second core network interface, and the identifier of the terminal device on the second core network interface is an identifier used to identify the terminal device on an interface through which the access network device communicates with the second core network device; and a processing unit 4901, configured to generate a change acknowledgement message, where the change acknowledgement message is used to notify the first core network device that the connection between the terminal device and the second core network device needs to be switched to the connection between the terminal device and the first core network device; and optionally, the change acknowledgement message includes one or a combination of the following three items: a first key of the terminal device, information about an identifier of the access network device in a first core network, and the information about the identifier of the terminal device on the second core network interface.

The transceiver unit 4902 is further configured to send the change acknowledgement message to the first core network device.

The second core network device sends the change message, to trigger a handover procedure and enable another network element to prepare for the switching. Therefore, a requirement of a network is met. In the network, the first core network device and the second core network device communicate with the terminal device by using the same access network device.

Further, in the second core network device, the terminal device establishes a connection to the second core network device.

Further, in the second core network device, the transceiver unit is configured to receive a first message, where the first message includes information about a route distinguisher of the first core network device or the information about the identifier of the access network device in the first core network.

The second core network device may learn of required information in a handover procedure by using the first message, to prepare well for the handover procedure.

Further, in the second core network device, the transceiver unit is configured to receive a release message, where the release message is used to instruct the second core network device to release the connection between the terminal device and the second core network device.

Further, in the second core network device, the processing unit is configured to release the connection between the terminal device and the second core network device.

The second core network device may complete resource release by using the foregoing release procedure, to save resources.

As shown in FIG. 4-2, a first core network device 480 includes:

a transceiver unit 4802, configured to receive a change acknowledgement message, where the change acknowledgement message is used to notify the first core network device that a connection between a terminal device and a second core network device needs to be switched to a connection between the terminal device and the first core network device; and optionally, the change acknowledgement message includes one or a combination of the following three items: a first key of the terminal device, information about an identifier of an access network device in a first core network, and information about an identifier of the terminal device on a second core network interface; and a processing unit 4801, configured to generate a change instruction message, where the change instruction message is used to instruct the access network device to instruct the terminal device to perform an update; and optionally, the change instruction message includes a second key of the terminal device and/or the information about the identifier of the terminal device on the second core network interface, and the second key is obtained based on the first key.

The transceiver unit 4802 is further configured to send the change instruction message to the access network device.

The first core network device may learn, by receiving the change acknowledgement message, that the first core network device needs to connect to the terminal device, and the first core network device may notify, by using the change instruction message, another network element that the first core network device and the second core network device prepare well for the switching, to meet a requirement of a network. In the network, the first core network device and the second core network device communicate with the terminal device by using the same access network device.

Further, in the first core network device, the transceiver unit is configured to: receive an acknowledgement message, where the acknowledgement message is used to indicate that the access network device and the terminal device complete the switching; and send a release message to the second core network device, where the release message is used to instruct the second core network device to release the connection between the terminal device and the second core network device.

Based on the foregoing release procedure, the first core network device may help the second core network device complete resource release, to save resources.

As shown in FIG. 4-3, an access network device 470 includes:

a processing unit 4701, configured to determine that a connection between a terminal device and a second core network device needs to be switched to a connection between the terminal device and a first core network device; and a transceiver unit 4702, configured to send a change message to the second core network device, where the change message is used to notify the second core network device that the connection between the terminal device and the second core network device needs to be switched to the connection between the terminal device and the first core network device. Optionally, the change message includes information about an identifier of the terminal device on a second core network interface, and the identifier of the terminal device on the second core network interface is an identifier used to identify the terminal device on an interface through which the access network device communicates with the second core network device.

The access network device determines that the switching is required, and sends the change message, to trigger a handover procedure and enable another network element to prepare for the switching. Therefore, a requirement of a network is met. In the network, the first core network device and the second core network device communicate with the terminal device by using the same access network device.

Further, in the access network device, the transceiver unit 4702 is configured to send a first message, where the first message includes information about a route distinguisher of the first core network device or information about an identifier of the access network device in a first core network.

The access network device may notify another network element of required information in a handover procedure by using the first message, to prepare well for the handover procedure.

Further, in the access network device, the transceiver unit 4702 is configured to receive a change instruction message, where the change instruction message is used to instruct the access network device to instruct the terminal device to perform an update. Optionally, the change instruction message includes a second key of the terminal device and/or the information about the identifier of the terminal device on the second core network interface.

The processing unit 4701 is configured to generate an update message, where the update message is used to instruct the terminal device to perform an update, and optionally, the update message is used to instruct the terminal device to update a NAS type and/or update a key of the terminal device.

The transceiver unit 4702 is configured to notify the terminal device of the update message.

The access network device may learn, by receiving the change instruction message, that the second core network device and the first core network device prepare well for the switching. The access network device may start an update procedure on a terminal side by generating and sending the update message, to meet a requirement of a network.

Further, in the access network device, the processing unit 4701 is configured to generate an acknowledgement message, where the acknowledgement message is used to indicate that the access network device and the terminal device complete the switching; and the transceiver unit 4702 is configured to send the acknowledgement message to the first core network device.

Further, in the access network device, the processing unit 4701 is configured to generate a release message, where the release message is used to instruct the second core network device to release the connection between the terminal device and the second core network device; and the transceiver unit 4702 is configured to send the release message to the second core network device.

The second core network device may complete resource release by using the foregoing release procedure, to save resources.

As shown in FIG. 4-4, a terminal device includes:

a transceiver unit 4602, configured to receive an update message, where the update message is used to instruct the terminal device to perform an update, and optionally, the update message is used to instruct the terminal device to update a NAS type and/or update a key of the terminal device; and a processing unit 4601, configured to update the NAS type and/or update the key of the terminal device.

The updating a NAS type includes: updating a NAS type used for communication with a second core network device to a NAS type used for communication with a first core network device; and the updating a key of the terminal device includes: updating a first key used for communication with the second core network device to a second key used for communication with the first core network device.

The terminal device may complete, by using the update message and completing a corresponding update action, a handover from the second core network device to the first core network device, to meet a requirement of a network. In the network, the first core network device and the second core network device communicate with the terminal device by using a same access network device.

Third Embodiment

An embodiment of the present invention provides a handover method. The method is applied to a communications system shown in FIG. 5. The communications system includes a terminal device, a first access network device, a second access network device, a first core network device, and a second core network device. The first core network device and the second core network device communicate with the terminal device by using the same first access network device. Further, the first core network device and the second core network device may use different core network technologies. Refer to the explanation in FIG. 3. The first access network device may be compatible with two different core network technologies.

It can be learned that the third embodiment is partially similar to the first embodiment. A same thing lies in that a connection between the terminal device and the second core network device needs to be switched to a connection between the terminal device and the first core network device, and a difference lies in that the terminal device initially establishes a connection to the second core network device by using the second access network device, instead of using the first access network device. The second access network device does not necessarily need to be directly connected to the first core network device. For brevity of description, a same reference numeral is used for a same part or similar parts in FIG. 5 and FIG. 3. Therefore, details are not described again. It may be understood that the related descriptions in FIG. 3 may be used to explain the technical solution in FIG. 5.

Figure 5:
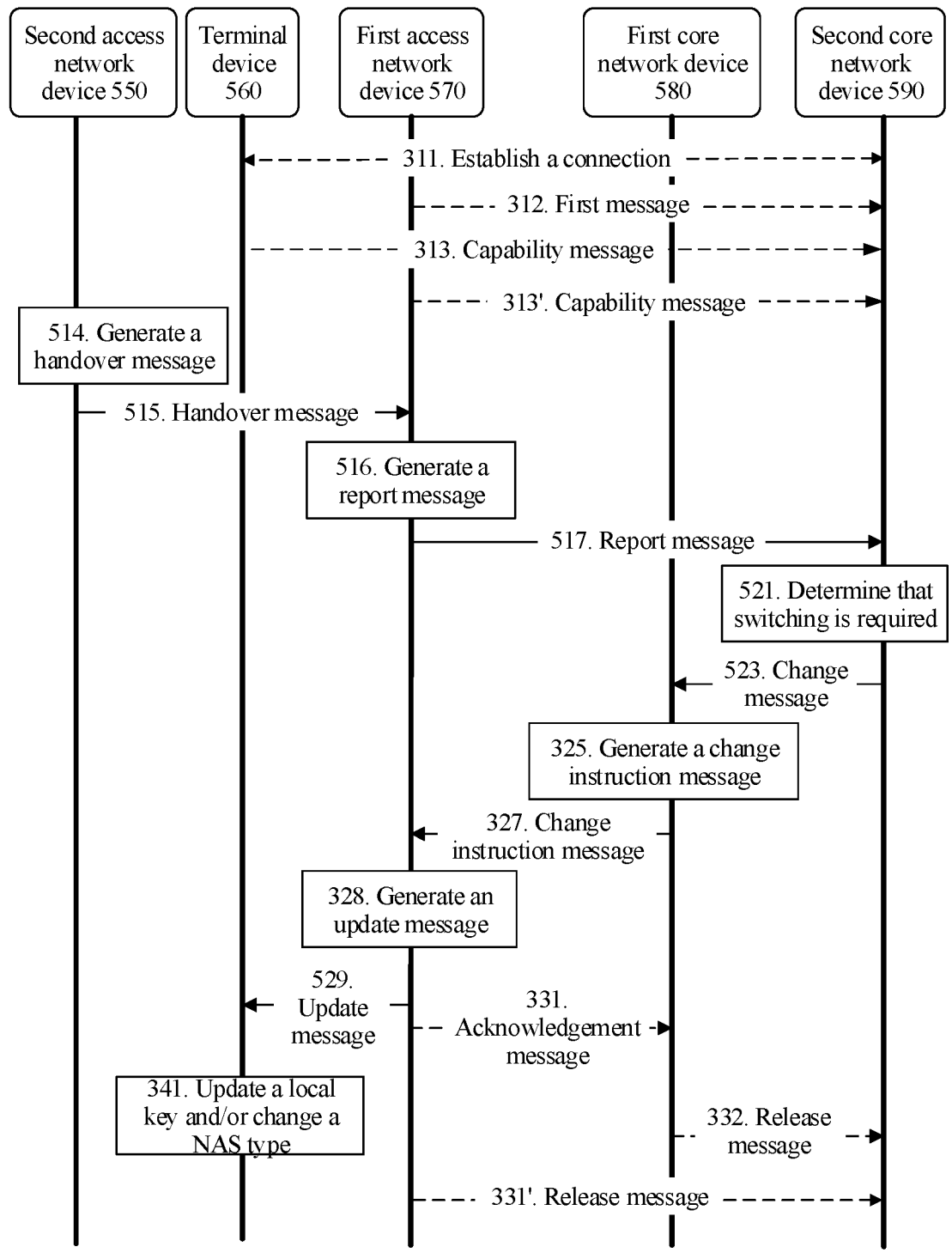
FIG. 5 is a schematic flowchart of a handover method according to an embodiment of the present invention.
Figures 1, 5:
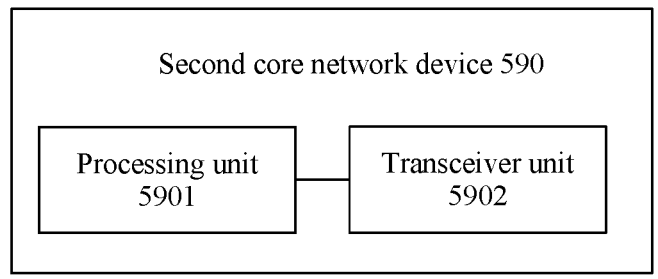
Figures 2, 5:
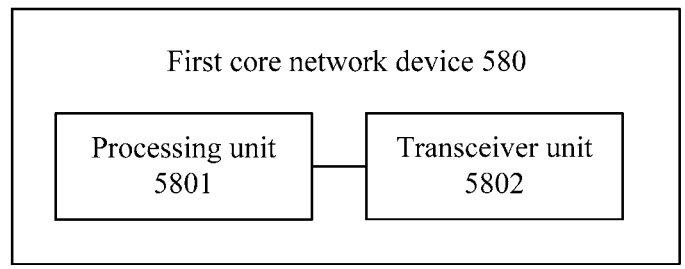
Figures 3, 5:
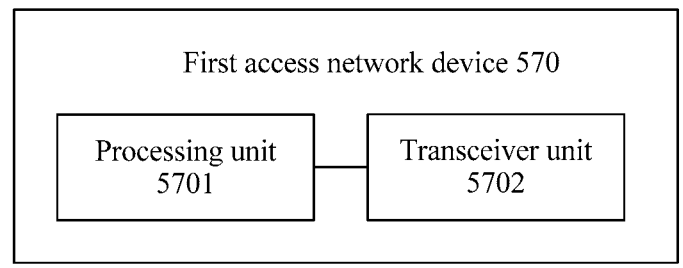
Figures 4, 5:
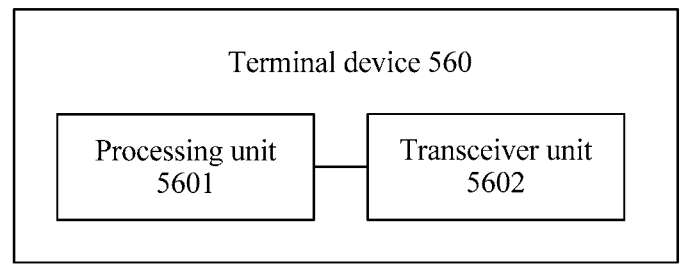
Figure 5:
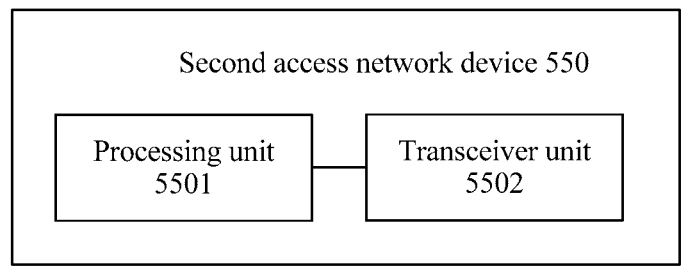

As shown in FIG. 5, the method includes the following steps.

311. The terminal device establishes a connection to the second core network device by using the second access network device. The terminal device may establish the connection to the second core network device in a known manner. Usually, the terminal device establishes the connection to the second core network device by using an access network device. However, a person skilled in the art may understand that the connection may be established in another manner. For example, the terminal device directly sends a message to the second core network device.

312. The first access network device sends a first message to the second core network device, where the first message includes information about a route distinguisher of the first core network device or information about an identifier of the access network device in a first core network. The information about the route distinguisher of the first core network device is used to indicate a route of a message that is to be sent by the second core network device to the first core network device. Refer to the related descriptions in FIG. 3.

313. The second core network device receives a capability message, where the capability message is used to indicate that the terminal device supports the terminal device in establishing a connection to the first core network device. It may be understood that the capability message may be sent by the terminal device to the second core network device, or may be sent by the first access network device to the second core network device. For example, the capability message may be a non-access stratum NAS message.

514. The second access network device generates a handover message, where the handover message is used to indicate that a connection between the terminal device and the second access network device needs to be switched to a connection between the terminal device and the first access network device. Further, the handover message includes information about an identifier of the terminal device on a second core network interface. The identifier of the terminal device on the second core network interface includes an identifier used to identify the terminal device on an interface through which the access network device communicates with the second core network device, for example, may be an S1 AP UE ID. The second access network device initiates a handover procedure between access network devices based on the handover message. Specifically, for determining, by the second access network device, a condition on which the handover procedure between the access network devices needs to be initiated, refer to a related technology of an inter-cell handover in the prior art.

515. The second access network device sends the handover message to the first access network device.

The second access network device sends the handover message to instruct another network element to prepare to establish a connection to the terminal device.

516. The first access network device generates a report message, where the report message is used to notify the second core network device that the connection between the terminal device and the second access network device needs to be switched to the connection between the terminal device and the first access network device. Further, the report message includes the information about the identifier of the terminal device on the second core network interface. Similar to the change message in the second embodiment, the report message may further include the information about the route distinguisher of the first core network device or the information about the identifier of the access network device in the first core network.

517. The first access network device sends the report message to the second core network device. It may be understood that steps 514 to 517 are similar to a conventional inter-cell handover procedure, to be specific, a terminal device needs to be handed over from a second access network device in a second network to a first access network device, but the first access network device is further connected to a first core network device, and is a relatively special access network device.

521. The second core network device determines that a connection between the terminal device and the second core network device needs to be switched to a connection between the terminal device and the first core network device. Refer to step 321 in FIG. 3. Details are not described again. For example, the second core network device considers that a 5G service capability of the first access network device is insufficient, and a 4G service capability of the first access network device needs to be used, and therefore a handover procedure between core network devices is initiated. Correspondingly, a handover from the second access network device to the first access network device is performed, but a network type is also changed.

523. The second core network device sends a change message to the first core network device, where the change message is used to notify the first core network device that the connection between the terminal device and the second core network device needs to be switched to the connection between the terminal device and the first core network device. Optionally, the change message includes at least one or a combination of the following content: a first key of the terminal device, the information about the identifier of the access network device in the first core network, and the information about the identifier of the terminal device on the second core network interface. Refer to step 323. Details are not described again.

325. The first core network device generates a change instruction message, where the change instruction message is used to instruct the access network device to instruct the terminal device to perform an update. Optionally, the change instruction message includes a second key of the terminal device and/or the information about the identifier of the terminal device on the second core network interface, and the second key is obtained based on the first key. Refer to the solution in FIG. 3.

327. The first core network device sends the change instruction message to the first access network device. Further, the first core network device may send the change instruction message to the access network device based on the information about the identifier of the access network device in the first core network.

328. The first access network device generates an update message, where the update message is used to instruct the terminal device to perform an update, and optionally, the update message is used to instruct the terminal device to update a NAS type and/or update a key of the terminal device. The updated key of the terminal device is obtained based on a local key stored on the terminal device. Optionally, a new key is deduced from the local key by using a deduction method that is the same as that of the first core network device.

The access network device may learn of, based on the information about the identifier of the terminal device on the second core network interface, a terminal device that needs to update a key. The access network device receives and locally stores the second key, so as to use the second key when communicating with the terminal device.

529. The first access network device notifies the terminal device of the update message.

It may be understood that, if the first access network device has completed an inter-cell handover from the second access network device, in other words, the first access network device has established a direct connection to the terminal device, the second access network device no longer needs to be used, and the first access network device may directly notify the terminal device of the update message. It may be understood that, as an alternative solution, the first access network device may use the second access network device to forward the update message (not shown), in other words, the second access network device does not process the update message and only forwards the update message.

Optionally, the method may further include: sending, by the first access network device, a message to the second access network device (not shown), where the message is used to indicate to the second access network device that the switching has been completed and the connection to the terminal device may be released. The message may be sent before the update message, or may be sent after the update message, and a similar function may be alternatively completed by using information carried in the update message.

341. The terminal device updates the local key and/or changes the non-access stratum NAS type based on the update message. Refer to the solution in FIG. 3.

331. The access network device sends an acknowledgement message to the first core network device, where the acknowledgement message is used to indicate that the access network device and the terminal device complete the switching.

332. The first core network device sends a release message to the second core network device, where the release message is used to instruct the second core network device to release the connection between the terminal device and the second core network device.

The method may further include step 331' as an alternative to steps 331 and 332: The access network device sends a release message to the second core network device, where the release message is used to instruct the second core network device to release the connection between the terminal device and the second core network device.

Further, the second core network device releases the connection between the terminal device and the second core network device (not shown).

Based on a handover procedure initiated by the second core network device, the connection between the terminal device and the second core network device may be switched to the connection between the terminal device and the first core network device without switching of the access network device, so that a network communication requirement is efficiently met.

For the terminal device, only a conventional inter-cell handover is initially initiated. To be specific, the handover from the second access network device to the first access network device is performed. However, because the first access network device accesses the first core network device in addition to accessing the second core network device, the second core network device further triggers a handover from the second core network device to the first core network device based on the conventional inter-cell handover, so that different service quality is provided. For example, UE originally performs only an inter-cell handover in a 5G network. Because a target base station is an e-eNB, and the base station may also access a 4G network, a core network device of 5G further hands over the UE to the 4G network, and a corresponding core network device also becomes an EPC of 4G It can be learned that, in an early stage of establishing the 5G network, because a service capability of 5G is insufficient, the UE can be handed over to the 4G network more quickly by using the foregoing solution, so that a handover requirement is met.

In the flowchart of FIG. 5, a dashed line indicates that the step is optional. To be specific, one or a combination of steps 311, 312, 313, and 313' may be omitted, and one or a combination of steps 331, 332, and 331' may be omitted. Refer to the explanation in FIG. 3.

For various network elements in FIG. 5, the following different methods may be obtained. The following methods are consistent with the method in FIG. 5, and details are not described again for a same part. The steps and the related descriptions of the method in FIG. 5 may provide reference and have similar advantages to the following methods. For brevity of description, details are not described again. It may be understood that in the following methods, the first core network device and the second core network device communicate with the terminal device by using the same first access network device.

A handover method is used by the second core network device and includes:

receiving, by the second core network device, a report message, where the report message is used to notify the second core network device that a connection between the terminal device and the second access network device needs to be switched to a connection between the terminal device and the first access network device. Further, the report message includes information about an identifier of the terminal device on a second core network interface.

521. The second core network device determines that a connection between the terminal device and the second core network device needs to be switched to a connection between the terminal device and the first core network device.

523. The second core network device sends a change message to the first core network device, where the change message is used to notify the first core network device that the connection between the terminal device and the second core network device needs to be switched to the connection between the terminal device and the first core network device. Optionally, the change message includes at least one or a combination of the following content: a first key of the terminal device, information about an identifier of the access network device in a first core network, and the information about the identifier of the terminal device on the second core network interface.

The second core network device determines that the switching is required, and sends the change message, to trigger a handover procedure and enable another network element to prepare for the switching. Therefore, a requirement of a network is met. In the network, the first core network device and the second core network device communicate with the terminal device by using the same access network device.

Further, the handover method further includes the following step: 311. The terminal device establishes a connection to the second core network device.

Further, the handover method further includes:

receiving, by the second core network device, a first message, where the first message includes information about a route distinguisher of the first core network device or the information about the identifier of the access network device in the first core network; and/or receiving, by the second core network device, a capability message, where the capability message is used to indicate that the terminal device supports the terminal device in establishing a connection to the first core network device.

The second core network device may learn of required information in a handover procedure by using the first message or the capability message, to prepare well for the handover procedure.

Further, the handover method further includes:

receiving, by the second core network device, a release message, where the release message is used to instruct the second core network device to release the connection between the terminal device and the second core network device.

Further, the handover method further includes:

releasing, by the second core network device, the connection between the terminal device and the second core network device.

The second core network device may complete resource release by using the foregoing release procedure, to save resources.

A handover method is used by the first core network device and includes:

receiving, by the first core network device, a change message, where the change message is used to notify the first core network device that a connection between the terminal device and the second core network device needs to be switched to a connection between the terminal device and the first core network device. Optionally, the change message includes at least one or a combination of the following content: a first key of the terminal device, information about an identifier of the access network device in a first core network, and information about an identifier of the terminal device on a second core network interface.

325. The first core network device generates a change instruction message, where the change instruction message is used to instruct the access network device to instruct the terminal device to perform an update. Optionally, the change instruction message includes a second key of the terminal device and/or the information about the identifier of the terminal device on the second core network interface, and the second key is obtained based on the first key.

327. The first core network device sends the change instruction message to the first access network device. Further, the first core network device may send the change instruction message to the access network device based on the information about the identifier of the access network device in the first core network.

The first core network device may learn, by receiving the change message, that the first core network device needs to connect to the terminal device, and the first core network device may notify, by using the change instruction message, another network element that the first core network device and the second core network device prepare well for the switching, to meet a requirement of a network. In the network, the first core network device and the second core network device communicate with the terminal device by using the same access network device.

Further, the handover method further includes:

receiving, by the first core network device, an acknowledgement message, where the acknowledgement message is used to indicate that the access network device and the terminal device complete the switching.

332. The first core network device sends a release message to the second core network device, where the release message is used to instruct the second core network device to release the connection between the terminal device and the second core network device.

Based on the foregoing release procedure, the first core network device may help the second core network device complete resource release, to save resources.

A handover method is used by the first access network device and includes:

receiving, by the first access network device, a handover message, where the handover message is used to indicate that a connection between the terminal device and the second access network device needs to be switched to a connection between the terminal device and the first access network device. Further, the handover message includes information about an identifier of the terminal device on a second core network interface, and the identifier of the terminal device on the second core network interface includes an identifier used to identify the terminal device on an interface through which the access network device communicates with the second core network device.

516. The first access network device generates a report message, where the report message is used to notify the second core network device that the connection between the terminal device and the second access network device needs to be switched to the connection between the terminal device and the first access network device. Further, the report message includes the information about the identifier of the terminal device on the second core network interface.

517. The first access network device sends the report message to the second core network device.

Optionally, the report message may further include information about a route distinguisher of the first core network device or information about an identifier of the access network device in a first core network.

By using the handover message and generating the report message, the first access network device may prepare for the switching and transmit related information to the core network device, to meet a requirement of a network.

A handover method is used by the first access network device and includes:

receiving, by the access network device, a change instruction message, where the change instruction message is used to instruct the first access network device to instruct the terminal device to perform an update. Optionally, the change instruction message includes a second key of the terminal device and/or information about an identifier of the terminal device on a second core network interface.

328. The access network device generates an update message, where the update message is used to instruct the terminal device to perform an update, and optionally, the update message is used to instruct the terminal device to update a NAS type and/or update a key of the terminal device.

529. The access network device notifies the terminal device of the update message.

The access network device may learn, by receiving the change instruction message, that the second core network device and the first core network device prepare well for the switching. The access network device may start an update procedure on a terminal side by generating and sending the update message, to meet a requirement of a network. In the network, the first core network device and the second core network device communicate with the terminal device by using the same access network device.

Further, the handover method further includes:

sending, by the access network device, a first message, where the first message includes information about a route distinguisher of the first core network device or information about an identifier of the access network device in a first core network.

The access network device may notify another network element of required information in a handover procedure by using the first message, to prepare well for the handover procedure.

Further, the handover method further includes the following step:

331. The access network device sends an acknowledgement message to the first core network device, where the acknowledgement message is used to indicate that the access network device and the terminal device complete the switching.

Further, the handover method further includes the following step:

331'. The access network device sends a release message to the second core network device, where the release message is used to instruct the second core network device to release the connection between the terminal device and the second core network device.

Based on the foregoing release procedure, the access network device may help the second core network device complete resource release, to save resources.

A handover method is used by the terminal device and includes:

receiving, by the terminal device, an update message, where the update message is used to instruct the terminal device to perform an update, and optionally, the update message is used to instruct the terminal device to update a NAS type and/or update a key of the terminal device; and updating, by the terminal device, the NAS type and/or updating the key of the terminal device.

The terminal device may complete, by using the update message and completing a corresponding update action, a handover from the second core network device to the first core network device, to meet a requirement of a network. In the network, the first core network device and the second core network device communicate with the terminal device by using the same access network device.

Further, the handover method further includes:

sending, by the terminal device, a capability message, where the capability message is used to indicate that the terminal device supports the terminal device in establishing a connection to the first core network device.

The terminal device notifies, by using the capability information, another network element that the terminal device may support communication with the first core network device, to prepare well for the switching.

A handover method is used by an access network device. The access network device is the second access network device, and the method includes the following steps.

514. The access network device generates a handover message, where the handover message is used to indicate that a connection between the terminal device and the second access network device needs to be switched to a connection between the terminal device and the first access network device. Further, the handover message includes information about an identifier of the terminal device on a second core network interface. The identifier of the terminal device on the second core network interface includes an identifier used to identify the terminal device on an interface through which the access network device communicates with the second core network device, for example, may be an S1 AP UE ID.

515. The access network device sends the handover message to the first access network device.

The second access network device sends the handover message to instruct another network element to prepare to establish a connection to the terminal device.

An embodiment of the present invention provides a communications system. The communications system includes a terminal device, a first access network device, a second access network device, a first core network device, and a second core network device. The first core network device and the second core network device communicate with the terminal device by using the same first access network device. The system may use the handover method shown in FIG. 5. Further, the first core network device and the second core network device may use different core network technologies. For example, the first core network device may be a core network device that uses an LTE core network technical specification, and the second core network device may be a core network device that uses a 5G core network technical specification. For another example, the first core network device may be a core network device that uses the 5G core network technical specification, and the second core network device may be a core network device that uses the LTE core network technical specification. The first access network device may be compatible with two different core network technologies.

The following devices may be related to the steps of the method described in FIG. 5. Therefore, the steps and the related descriptions of the method in FIG. 5 may provide reference and have similar advantages to the following devices. For brevity of description, details are not described again. It may be understood that in the following embodiments, the first core network device and the second core network device communicate with the terminal device by using the same first access network device.

As shown in FIG. 5-1, a second core network device 590 includes:

a transceiver unit 5902, configured to receive a report message, where the report message is used to notify the second core network device that a connection between the terminal device and a second access network device needs to be switched to a connection between the terminal device and a first access network device, and further, the report message includes information about an identifier of the terminal device on a second core network interface; and a processing unit 5901, configured to determine that a connection between the terminal device and the second core network device needs to be switched to a connection between the terminal device and the first core network device.

The transceiver unit 5902 is further configured to send a change message to the first core network device, where the change message is used to notify the first core network device that the connection between the terminal device and the second core network device needs to be switched to the connection between the terminal device and the first core network device. Optionally, the change message includes a first key of the terminal device and/or information about an identifier of the access network device in a first core network.

The second core network device determines that the switching is required, and sends the change message, to trigger a handover procedure and enable another network element to prepare for the switching. Therefore, a requirement of a network is met. In the network, the first core network device and the second core network device communicate with the terminal device by using the same access network device.

Further, in the second core network device, the terminal device establishes a connection to the second core network device.

Further, in the second core network device, the transceiver unit is configured to receive a first message, where the first message includes information about a route distinguisher of the first core network device or the information about the identifier of the access network device in the first core network; and/or the transceiver unit is configured to receive a capability message, where the capability message is used to indicate that the terminal device supports the terminal device in establishing a connection to the first core network device.

The second core network device may learn of required information in a handover procedure by using the first message or the capability message, to prepare well for the handover procedure.

Further, in the second core network device, the transceiver unit is configured to receive a release message, where the release message is used to instruct the second core network device to release the connection between the terminal device and the second core network device.

Further, in the second core network device, the processing unit is configured to release the connection between the terminal device and the second core network device.

The second core network device may complete resource release by using the foregoing release procedure, to save resources.

As shown in FIG. 5-2, a first core network device 580 includes:

a transceiver unit 5802, configured to receive a change message, where the change message is used to notify the first core network device that a connection between a terminal device and a second core network device needs to be switched to a connection between the terminal device and the first core network device; and optionally, the change message includes at least one or a combination of the following content: a first key of the terminal device, information about an identifier of an access network device in a first core network, and information about an identifier of the terminal device on a second core network interface; and a processing unit 5801, configured to generate a change instruction message, where the change instruction message is used to instruct the access network device to instruct the terminal device to perform an update; and optionally, the change instruction message includes a second key of the terminal device and/or the information about the identifier of the terminal device on the second core network interface, and the second key is obtained based on the first key.

The transceiver unit 5802 is further configured to send the change instruction message to the access network device.

The first core network device may learn, by receiving the change message, that the first core network device needs to connect to the terminal device, and the first core network device may notify, by using the change instruction message, another network element that the first core network device and the second core network device prepare well for the switching, to meet a requirement of a network. In the network, the first core network device and the second core network device communicate with the terminal device by using the same access network device.

Further, in the first core network device, the transceiver unit is configured to receive an acknowledgement message, where the acknowledgement message is used to indicate that the access network device and the terminal device complete the switching; and the transceiver unit is configured to send a release message to the second core network device, where the release message is used to instruct the second core network device to release the connection between the terminal device and the second core network device.

Based on the foregoing release procedure, the first core network device may help the second core network device complete resource release, to save resources.

As shown in FIG. 5-3, an access network device 570 is provided. The access network device is a first access network device and includes:

a transceiver unit 5702, configured to receive a handover message, where the handover message is used to indicate that a connection between a terminal device and a second access network device needs to be switched to a connection between the terminal device and the first access network device; and further, the handover message includes information about an identifier of the terminal device on a second core network interface, and the identifier of the terminal device on the second core network interface includes an identifier used to identify the terminal device on an interface through which the access network device communicates with a second core network device; and a processing unit 5701, configured to generate a report message, where the report message is used to notify the second core network device that the connection between the terminal device and the second access network device needs to be switched to the connection between the terminal device and the first access network device, and further, the report message includes the information about the identifier of the terminal device on the second core network interface.

The transceiver unit 5702 is further configured to send the report message to the second core network device.

Optionally, the report message may further include information about a route distinguisher of a first core network device or information about an identifier of the access network device in a first core network.

By using the handover message and generating the report message, the first access network device may prepare for the switching and transmit related information to the core network device, to meet a requirement of a network.

A first access network device 570 includes:

a transceiver unit 5702, configured to receive a change instruction message, where the change message is used to notify the first core network device that a connection between a terminal device and a second core network device needs to be switched to a connection between the terminal device and the first core network device; and optionally, the change instruction message includes a second key of the terminal device and/or information about an identifier of the terminal device on a second core network interface; and a processing unit 5701, configured to generate an update message, where the update message is used to instruct the terminal device to perform an update, and optionally, the update message is used to instruct the terminal device to update a NAS type and/or update a key of the terminal device.

The transceiver unit 5702 is further configured to notify the terminal device of the update message.

The access network device may learn, by receiving the change instruction message, that the second core network device and the first core network device prepare well for the switching. The access network device may start an update procedure on a terminal side by generating and sending the update message, to meet a requirement of a network. In the network, the first core network device and the second core network device communicate with the terminal device by using the same access network device.

Further, in the access network device, the processing unit 5701 is configured to generate a first message, where the first message includes information about a route distinguisher of the first core network device or information about an identifier of the access network device in a first core network; and the transceiver unit 5702 is configured to send the first message.

The access network device may notify another network element of required information in a handover procedure by using the first message, to prepare well for the handover procedure.

Further, in the access network device, the processing unit 5701 is configured to generate an acknowledgement message, where the acknowledgement message is used to indicate that the access network device and the terminal device complete the switching; and the transceiver unit 5702 is configured to send the acknowledgement message to the first core network device.

Further, in the access network device, the processing unit 5701 is configured to generate a release message, where the release message is used to instruct the second core network device to release the connection between the terminal device and the second core network device; and the transceiver unit 5702 is configured to send the release message to the second core network device.

Based on the foregoing release procedure, the access network device may help the second core network device complete resource release, to save resources.

As shown in FIG. 5-4, a terminal device includes:

a transceiver unit 5602, configured to receive an update message, where the update message is used to instruct the terminal device to perform an update, and optionally, the update message is used to instruct the terminal device to update a NAS type and/or update a key of the terminal device; and a processing unit 5601, configured to update the NAS type and/or update the key of the terminal device.

The terminal device may complete, by using the update message and completing a corresponding update action, a handover from a second core network device to a first core network device, to meet a requirement of a network. In the network, the first core network device and the second core network device communicate with the terminal device by using the same access network device.

Further, in the terminal device, the processing unit is configured to generate a capability message, where the capability message is used to indicate that the terminal device supports the terminal device in establishing a connection to the first core network device; and the transceiver unit is configured to send the capability message.

The terminal device notifies, by using the capability message, another network element that the terminal device may support communication with the first core network device, to prepare well for switching.

As shown in FIG. 5-5, a second access network device 550 includes:

a processing unit 5501, configured to generate a handover message, where the handover message is used to indicate that a connection between a terminal device and the second access network device needs to be switched to a connection between the terminal device and a first access network device; and further, the handover message includes information about an identifier of the terminal device on a second core network interface, and the identifier of the terminal device on the second core network interface includes an identifier used to identify the terminal device on an interface through which the access network device communicates with a second core network device; and a transceiver unit 5502, configured to send the handover message to the first access network device.

The terminal device may complete, by using an update message and completing a corresponding update action, a handover from the second core network device to a first core network device, to meet a requirement of a network. In the network, the first core network device and the second core network device communicate with the terminal device by using the same access network device.

Figure 6:
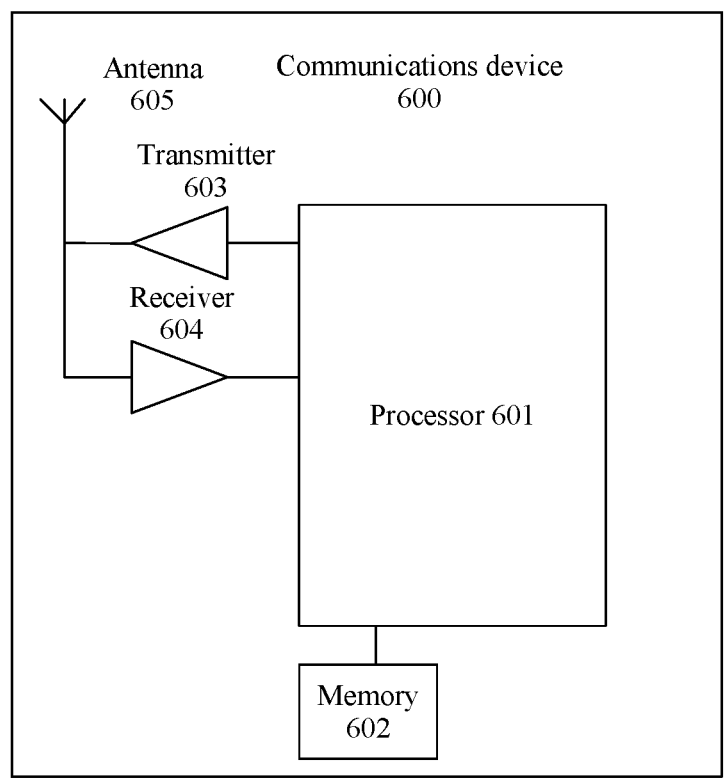
FIG. 6 is a schematic diagram of a communications device according to an embodiment of the present invention.
Figure 7:
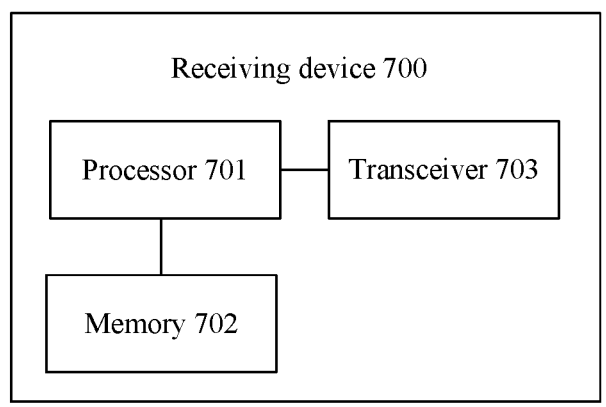
FIG. 7 is a schematic diagram of a communications device according to an embodiment of the present invention.

In the foregoing embodiments, the core network device, the access network device, and the terminal device shown in FIG. 3 to FIG. 5 are collectively referred to as communications devices. The processing unit used in these communications devices may be implemented by a processor, and the transceiver unit may be implemented by a transceiver. The transceiver may also include necessary components such as a transmitter, a receiver, and an antenna. A structure shown in FIG. 6 or FIG. 7 may be used for these communications devices. For ease of description, details are not described.

It may be understood that, although not shown, the communications devices may further include another apparatus such as an input apparatus, an output apparatus, and a battery. The processor may include a function of operating one or more software programs. The software program may be stored in a memory. The processor and a software instruction stored in the memory may be usually configured as an action performed by the communications devices. For example, the processor can operate a connection program. The memory may be a read-only memory, a flash memory, or a magnetic storage device, such as a hard disk, a floppy disk drive, or a magnetic tape. The memory may store one or more software programs, instructions, information blocks, pieces of data, and the like.

Optionally, in some embodiments, the memory may separately store instructions used to perform the methods performed by the communications devices in the methods shown in FIG. 3 to FIG. 5. The processor may execute the instructions stored in the memory, to complete, in combination with other hardware (such as the transmitter, the receiver, and the antenna), the steps performed by the communications devices in the methods shown in FIG. 3 to FIG. 5. For a specific working process and advantageous effects, refer to the descriptions of the communications devices in the embodiments shown in FIG. 3 to FIG. 5.

Steps in the foregoing methods can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly performed and accomplished by using a hardware decoding processor, or may be performed and accomplished by using a combination of hardware and software modules in the decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads instructions in the memory and completes the steps in the foregoing methods in combination with hardware of the processor.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art can implement the described functions by using different methods with regard to each specific application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces.

The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A device, comprising:
   a non-transitory memory storing executable instructions; and
   a processer configured to execute the executable instructions to perform operations comprising:
   receiving an update message;
   updating, in response to the update message, a NAS type and a key of a terminal device from a first NAS type and a first key used for communication with a second core network device to a second NAS type and a second key used for communication with a first core network device; wherein
   the second core network device is a new radio (NR) core network device; and
   the first core network device is an evolved packet core (EPC) device.

2. The device according to claim 1, wherein
   the first core network device and the second core network device communicate with the device by using a same access network device.

3. The device according to claim 1, the operations further comprises:
   sending a capability message, wherein the capability message indicates that the terminal device supports the terminal device in establishing a connection to the first core network device.

4. The device according to claim 1, wherein the updating the first key used for communication with the second core network device to the second key used for communication with the first core network device comprises,
   switching a local key of the terminal device from the first key to the second key.

5. A method, comprising:
   generating, by an access network device, an update message, wherein the update message instructs a terminal device to update a non-access stratum (NAS) type and a key of the terminal device from a first NAS type and a first key used for communication with a second core network device to a second NAS type and a second key used for communication with a first core network device;

sending, by the access network device, the update message to the terminal device; wherein
   the second core network device is a new radio (NR) core network device; and
   the first core network device is an evolved packet core (EPC) device.

6. The method according to claim 5, comprises,
   sending, by the access network device, a change message to the second core network device, wherein the change message notifies the second core network device that a connection between the terminal device and the second core network device needs to be switched to a connection between the terminal device and the first core network device.

7. The method according to claim 5, wherein the method further comprises:
   sending, by the access network device, a first message, wherein the first message comprises information about a route distinguisher of the first core network device or information about an identifier of the access network device.

8. The method according to claim 5, wherein
   receiving, by the access network device, a change instruction message, wherein the change instruction message instructs the access network device to instruct the terminal device to perform an update.

9. The method according to claim 8, wherein
   the change instruction message comprises at least one of a second key of the terminal device or information about an identifier of the terminal device on a second core network interface.

10. A method, comprising:
    receiving, by a terminal device, an update message;
    updating, by the terminal device in response to the update message, a NAS type or a key of the terminal device from a first NAS type or a first key used for communication with a second core network device to a second NAS type of a second key used for communication with a first core network device; wherein
    the second core network device is a new radio (NR) core network device; and
    the first core network device is an evolved packet core (EPC) device.

11. The method according to claim 10, wherein
    the first core network device and the second core network device communicate with the terminal device by using a same access network device.

12. The method according to claim 10, wherein the method further comprises:
    sending, by the terminal device, a capability message, wherein the capability message indicates that the terminal device supports the terminal device in establishing a connection to the first core network device.

13. The method according to claim 10, wherein the updating the first key used for communication with the second core network device to the second key used for communication with the first core network device, comprises:
    switching a local key of the terminal device from the first key to the second key.

* * * * *